(12) United States Patent
Cornell

(10) Patent No.: US 7,735,805 B2
(45) Date of Patent: Jun. 15, 2010

(54) WATER CONTROL VALVE

(76) Inventor: Boyd Cornell, 11128 Hampton Dr., Pickerington, OH (US) 43147

( * ) Notice: Subject to any disclaimer, the term of this patent is extended or adjusted under 35 U.S.C. 154(b) by 1139 days.

(21) Appl. No.: 11/367,823

(22) Filed: Mar. 3, 2006

(65) Prior Publication Data

US 2007/0205145 A1    Sep. 6, 2007

(51) Int. Cl.
*C02F 1/42* (2006.01)
*C02F 5/00* (2006.01)

(52) U.S. Cl. .................. 251/205; 210/190; 137/247.17; 137/625.18

(58) Field of Classification Search .............. 210/190; 251/205; 137/625.18, 247.17
See application file for complete search history.

(56) References Cited

U.S. PATENT DOCUMENTS

| | | |
|---|---|---|
| 3,183,933 A | 5/1965 | Whitlock |
| 3,225,790 A | 12/1965 | Laughlin |
| 3,298,396 A | 1/1967 | Gressman |
| 3,779,281 A | 12/1973 | Brane |
| 4,210,532 A | 7/1980 | Loke |
| 4,290,451 A | 9/1981 | Fleckenstein |
| 4,429,711 A | 2/1984 | Schomer |
| 5,045,187 A | 9/1991 | Suchanek |
| 5,162,080 A | 11/1992 | Drager |
| 5,893,393 A | 4/1999 | Erdkamp |
| 5,910,244 A | 6/1999 | Stamos |
| 6,293,298 B1 | 9/2001 | Brane |
| 6,334,604 B1 | 1/2002 | Roth |
| 6,371,162 B1 | 4/2002 | Groeneveld |
| 6,530,557 B1 | 3/2003 | Guzorek |
| 6,541,531 B2 | 4/2003 | Ragsdale |

OTHER PUBLICATIONS

International Search Report and Written Opinion of the International Searching Authority for International Application No. PCT/US07/03331, mailed Sep. 25, 2007, 5 pages.

*Primary Examiner*—Walter D Griffin
*Assistant Examiner*—Cameron J Allen
(74) *Attorney, Agent, or Firm*—Michael J. Gallagher; David J. Dawsey; Gallager & Dawsey Co., LPA

(57) ABSTRACT

A water control valve designed to control the flow of water from a source to a treatment tank having a plurality of treatment media, thereby providing a supply of treated water, and also provides other cycle controls. For instance, the water control valve directs water to backwash the media of sediment for discharge to a drain, permits regeneration of the media by directing a regeneration agent through the media, directs water through the media in a fast rinse cycle, and directs water to a regeneration agent reservoir for the purpose of refilling the reservoir. The water control valve has six valves and five motors for controlling the valve positions. The valves are fluidly connected to six chambers providing a pathway for water flow between the valves, to a regeneration injection assembly, through a central passageway or a perimeter passageway, to the treatment tank.

24 Claims, 21 Drawing Sheets

WATER CONTROL VALVE

TECHNICAL FIELD

The instant invention relates to water control valves for directing the flow of water in a water treatment system, and, more particularly, to a water control valve having a housing enclosing five valves and an injection assembly having a sixth valve such that the valves are rotatably connected to five motors, wherein the valve mates with a water softening tank.

BACKGROUND OF THE INVENTION

Water treatment systems are designed to condition incoming water in some fashion. A variety of water conditioning processes are available. For instance, water conditioning can be a distillation process, a demineralization process, a reverse osmosis process, or a filtration process, to name only a few. The demineralization process is of particular interest.

The demineralization process removes dissolved compounds, for example, calcium and magnesium compounds, from water. Since these compounds can become insoluble in water, particularly at elevated temperatures, they can precipitate and create scaling problems by adhering to piping and other surfaces. Therefore, water containing these less soluble compounds is called "hard" water. The scale can cause problems by restricting flow through pipes and may appear as a residue in bathroom showers, dishwashers, and in other areas of the home. The demineralization process removes the ions that cause the scale. This process is more commonly referred to as water softening.

Water softeners, like those found in many households, demineralize the water provided to the house by a public utility, private well, or other source. Water softeners include a treatment tank containing a plurality of resin media. The media is generally made of a synthetic polystyrene ion-exchange material. During the treatment process, the incoming hard water is passed through the media. The ion-exchange process removes the calcium and magnesium ions, the "hard" ions, and exchanges them for "soft" ions. For example, sodium is a soft ion because sodium compounds are more soluble in water. Therefore, sodium compounds do not have a propensity to precipitate onto the surfaces nearly to the degree as that of the calcium compounds. The soft water then passes out of the treatment system to a point of use.

A water softening system generally consists of a treatment tank, a brine tank or a regeneration agent reservoir, and a water control valve. The valve controls the flow of water between the source, the point of use, the regeneration agent reservoir, and the treatment tank. The water control valve directs water to the components of the water softening system according to a prearranged set of cycles, or water flow directions. Generally, the cycles consist of a service cycle, a backwashing cycle, a regeneration refill cycle, a regeneration cycle, and a fast rinsing cycle.

The service cycle water directs untreated water to the treatment tank where the water is softened or treated. The treated water flows out of the treatment system to its point of use, as needed. The service cycle takes sodium ions from the media and adds them to the untreated water to soften it. At the same time, the hard water ions are taken from the water and adsorbed onto the media. So, during the service cycle, the media is depleted of sodium ions and is loaded with the hard ions. Eventually, the media becomes ineffective at softening. Therefore, the media must be periodically backwashed and regenerated.

The media should be backwashed prior to regeneration. Water flow through the media is reversed during the backwashing cycle. The reverse water flow flushes sediment and other contaminants, such as oxidized iron, from the media and into a drain as waste water. In addition, backwashing prevents the media from becoming packed or channeled and assures consistent operation of the media during the service cycle.

During the subsequent regeneration cycle, a regeneration agent, typically a sodium chloride solution, is added to untreated water. A solution of sodium chloride and water is passed through the media. The flow direction of the regeneration agent through the media is important for efficient regeneration of the media. There are two configurations for controlling the direction of flow. In one configuration, the flow direction is down, commonly called down-flow or co-current flow. In the other configuration, the flow direction is up. This is referred to as up-flow or countercurrent flow. In both configurations, the media releases a majority of the calcium and magnesium ions into the solution and adsorbs the sodium ions from the solution. The water containing the calcium and magnesium ions, together with any residual sodium ions is waste water. The waste water is directed to the drain.

Following the backwashing cycle the media may be disrupted. If the media does not settle back into position properly the treatment process may be negatively impacted. The fast rinsing cycle generally has two purposes. The first is to forcibly repack the media. The second is to flush any residual regeneration agent from the media.

The control of the water flow to and from each of the system components during each of the cycles is a critical function. Past water control valves precede through a predetermined sequence of the cycles. That is, they proceed through each cycle in a chronological order without exception or variation. In fact, past water control valve designs prohibit variable sequence or cycle independency.

There remains an unfulfilled need to provide a water control valve which can cycle through a preset sequence of operations and change from one cycle to any other cycle without regard to a predetermined sequence to improve the flexibility and efficient response of the water softening system to changing demand. Additionally, there remains an unfilled need to provide a valve that may be configured quickly and easily in the field to operate in an up regeneration or down regeneration configuration.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

A water control valve of the present invention is designed for controlling the flow of water through a water softening system. The water control valve has a housing which encloses five chambers, namely: an influent chamber, a backwash chamber, a fast rinse chamber, an effluent chamber, and a discharge chamber. The housing also encloses five valves, namely: a supply valve, a backwash valve, an outlet valve, a fast rinse valve, and a bypass valve. The housing also has a perimeter passageway and a central passageway permitting the water control valve to be attached to a treatment tank.

In one embodiment of the instant invention, the influent chamber has an influent source port for receiving the untreated water from a public water utility, a water well, or other water source. The influent chamber is in fluid communication with the supply valve and the bypass valve. The backwash chamber is in fluid communication with the supply valve and the backwash valve. The discharge chamber has a discharge port, and the discharge chamber is in fluid communication with the backwash valve and the fast rinse valve. The fast rinse chamber is in fluid communication with the outlet valve and the fast rinse valve. The effluent chamber has an effluent port for distributing the treated water or untreated water. The effluent chamber is in fluid communication with the outlet valve and the bypass valve.

The perimeter passageway has a backwash port and a perimeter port. The backwash port is in fluid communication with the backwash chamber and the perimeter port provides fluid communication with the treatment tank. Similarly, the central passageway has a fast rinse port and a central port. The fast rinse port is in fluid communication with the fast rinse chamber and the central port is in fluid communication with the treatment tank. The central port resides within and is concentric to the perimeter port. Each of the valves has an open position and a closed position thereby providing control and routing of the water flow inside the housing.

In one embodiment of the instant invention, the water control valve includes a regeneration injection assembly which fluidly communicates with the chambers and the valves enclosed in the housing. The injection assembly has a regeneration connection port, a regeneration valve, a regeneration connector, and a regeneration passageway. The regeneration injection assembly has two configurations—a down regeneration configuration and an up regeneration configuration.

In the down regeneration configuration, the regeneration connector is in fluid communication with the influent chamber having an influent routing port and the backwash chamber having a backwash injection port. The regeneration injection assembly is connected to the housing at the influent routing port and the backwash injection port. The regeneration connection port is in fluid communication with the regeneration agent reservoir, the regeneration valve is in fluid communication with the regeneration connection port and the regeneration passageway, and the regeneration passageway is in fluid communication with the regeneration connector. When the regeneration valve is open, the regenerating agent may flow from the regeneration agent reservoir through the regeneration passageway to the regeneration connector, and when the regeneration valve is closed, the regenerating agent is substantially prevented from flowing from the regeneration agent reservoir through the regeneration passageway to the regeneration connector. The regeneration connector contains a regeneration agent injector.

In another embodiment of the instant invention, the regeneration injection assembly is in the up regeneration configuration. The regeneration injection assembly is in fluid communication with the effluent chamber having an effluent routing port and the fast rinse chamber having a fast rinse injection port. The regeneration connector is in fluid communication with the effluent routing port and the fast rinse injection port. The water flow in regeneration cycle when the water control valve is configured to the up regeneration configuration is different than when the water control valve is configured in the down regeneration configuration.

The unique arrangement of the chambers, the valves, and the passageways provides fluid communication between adjacent components. As one skilled in the art will observe and appreciate, the valves may be individually and independently opened and closed to direct water in a variety of directions for various uses or treatments.

During the operation of the water control valve, the valves are positioned to direct water flow into five defined cycles, namely: a service cycle, a backwash cycle, a fast rinse cycle, and a down regeneration cycle and a down regeneration refill cycle or an up regeneration cycle and an up regeneration refill cycle. Each cycle is characterized by a unique set of valve positions. The purpose of the service cycle is to treat water for use. The purpose of the backwash cycle is to reverse the flow of water through the media relative to the service cycle. The reversed water flow helps flush away any macroscopic contaminates that are trapped in the media. In the fast rinse cycle the water control valve directs water through the media in the same direction as the service cycle to clean and repack the media. In general, the up and down regeneration cycles transfer the regeneration agent from the regeneration agent reservoir to the media. After repeated regeneration cycles, the regeneration reservoir will be emptied of the regeneration agent. The water control valve is designed to direct water flow to the regeneration reservoir to refill it with water during the down or up regeneration refill cycle.

The water flow through the water control valve during the down and the up regeneration cycles are different. Likewise, the water flow through the water control valve during the down and up regeneration refill cycles are different.

The water control valve of the instant invention enables a significant advance in the state of the art. The instant invention is, in addition, widely applicable to a large number of applications. The various embodiments, as would be understood by one skilled in the art, would be suitable to any application requiring the control of fluid flow. These variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The water control valve (100) of the instant invention enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

A water control valve (100) of the present invention is designed for controlling the flow of water through a treatment tank (30). As one skilled in the art will appreciate, the treatment tank (30) may contain a plurality of media (35) which may be ion-exchange resin media used for demineralization or water softening, or the treatment tank (30) could contain a filtration system for removing particulates or other microscopic matter from water, or the treatment tank (30) could contain a reverse osmosis system or a distillation system.

Figure 1:
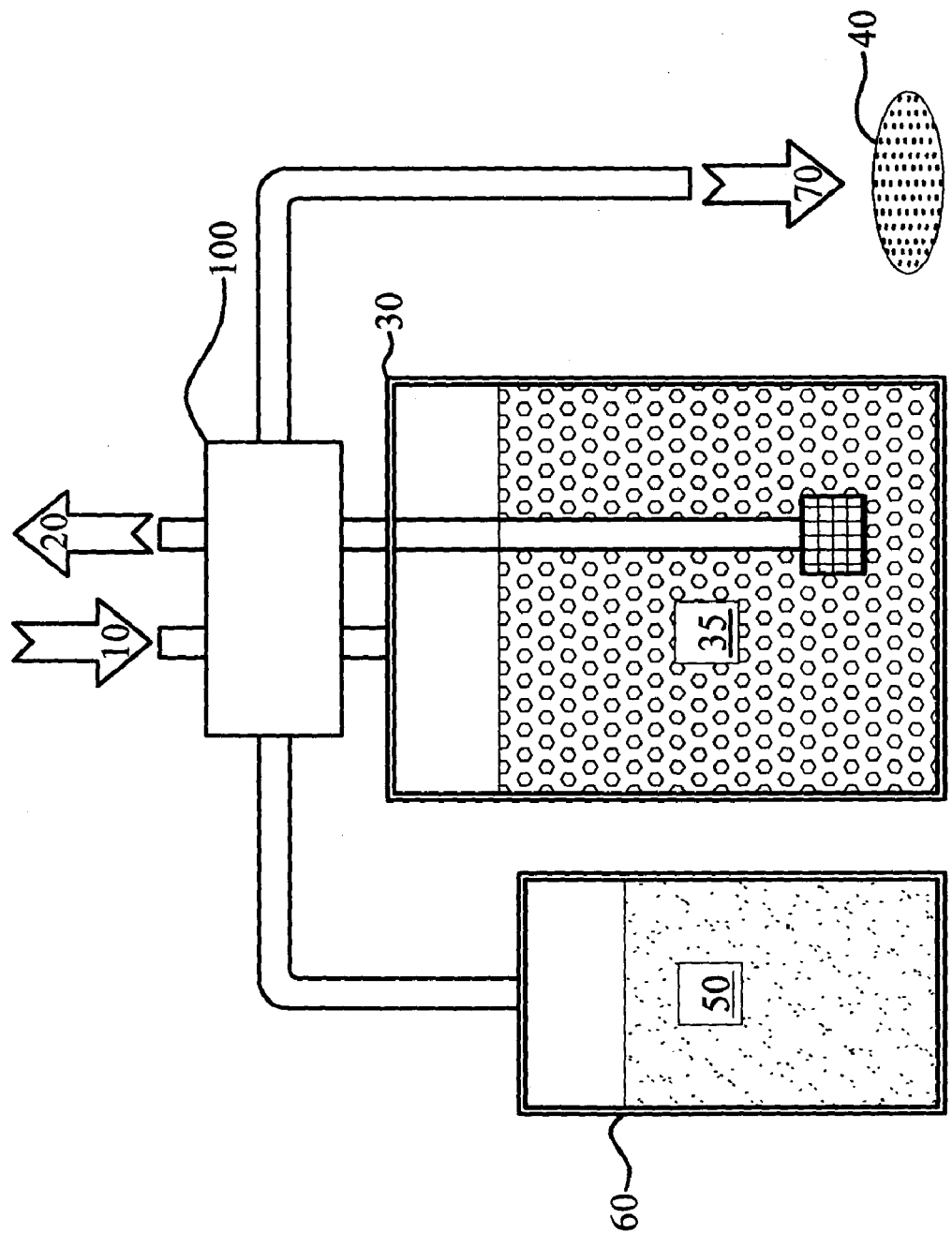
FIG. 1 is a schematic showing the operative connections of the water control valve to a treatment tank and a regeneration reservoir, not to scale.

In one embodiment of the instant invention, the water control valve (100) operates to direct water flow in a water softening system. With reference now to FIG. 1, the water control valve (100) directs untreated water (10) supplied from a source through the media (35) to make treated water (20). The water control valve (100) is also capable of backwashing the media (35) with the untreated water (10) to dislodge any sediment to a drain (40) as waste water (70), injecting a regenerating agent (50) supplied by a regeneration agent reservoir (60) into the untreated water (10) to regenerate the media (35), rinsing the media (35) while providing treated water (20) for distribution, and refilling the regeneration agent reservoir (60) with the untreated water (10).

Figure 2:
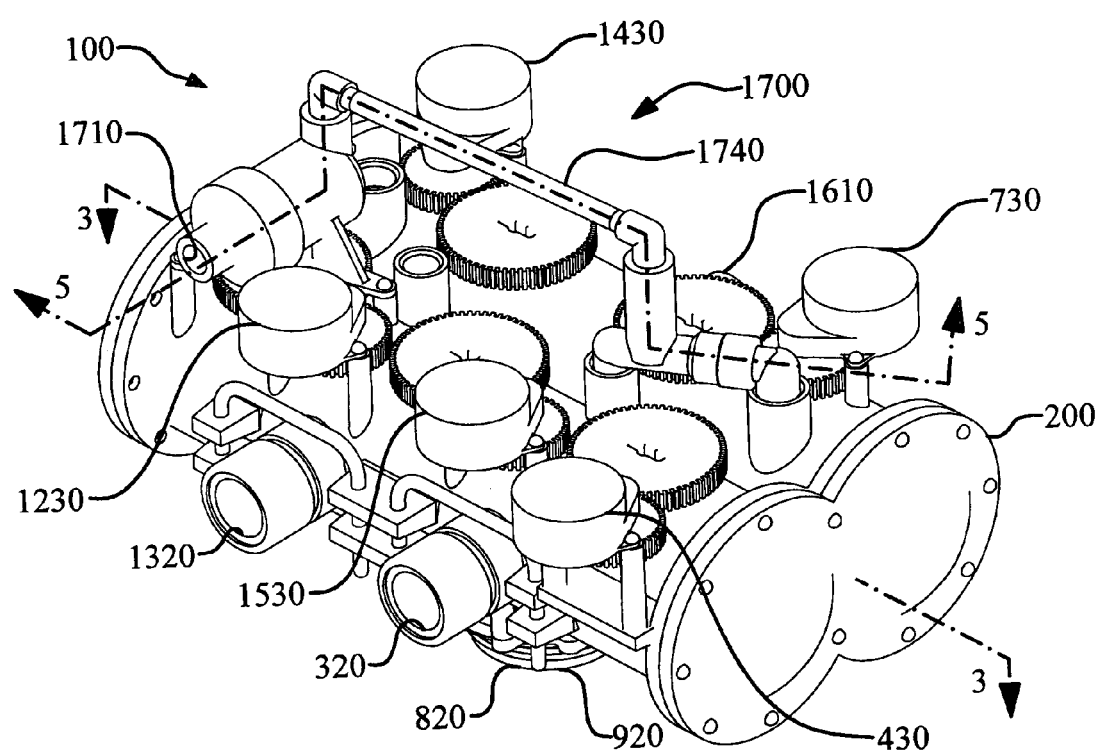
FIG. 2 is an isometric view of an embodiment of a water control valve with a regeneration injection assembly in the down regeneration configuration, not to scale.
Figure 3:
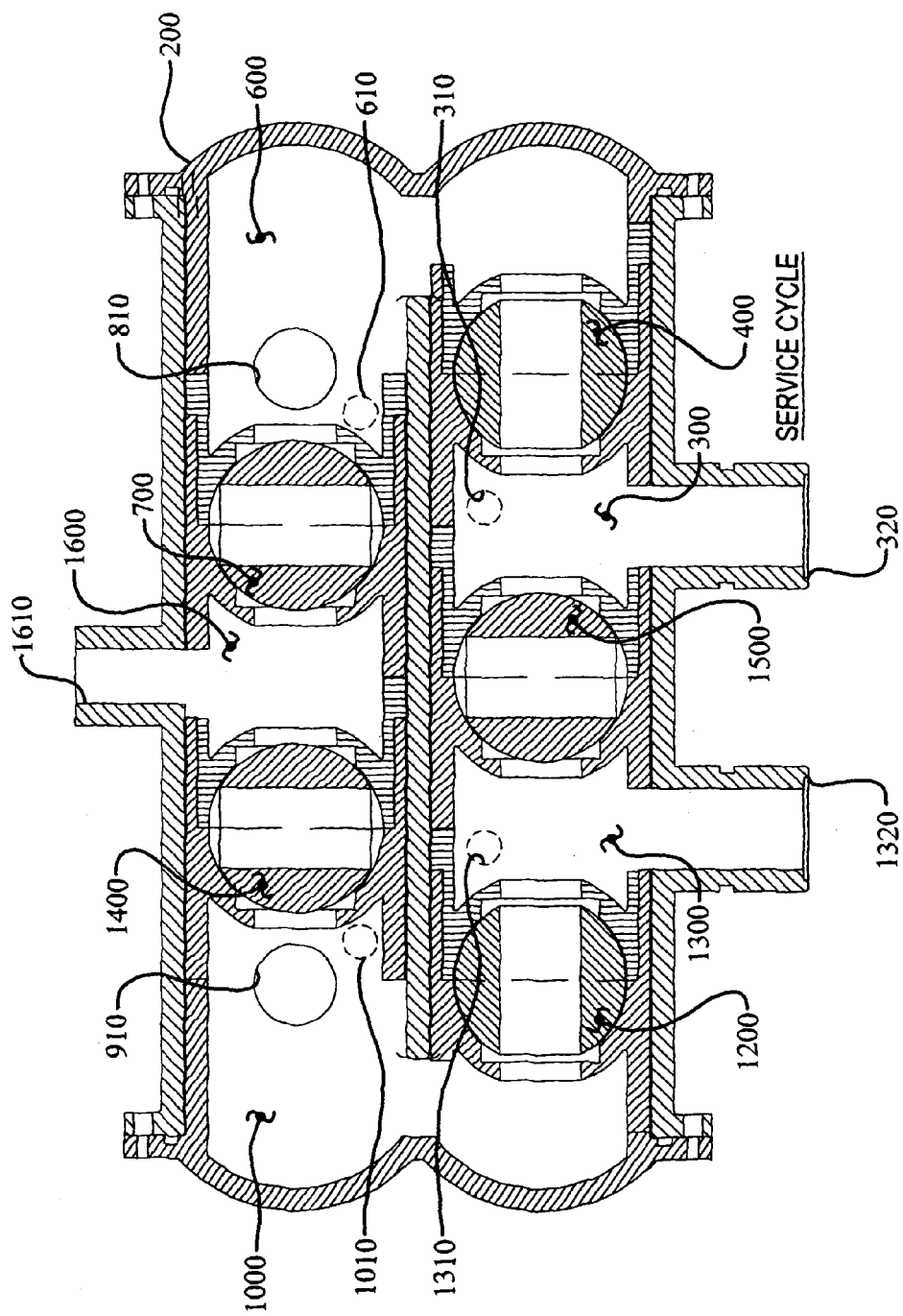
FIG. 3 is a cross-sectional view taken along section line 3-3 in FIG. 2 showing the valve positions for directing water in the service cycle, not to scale.
Figure 4:
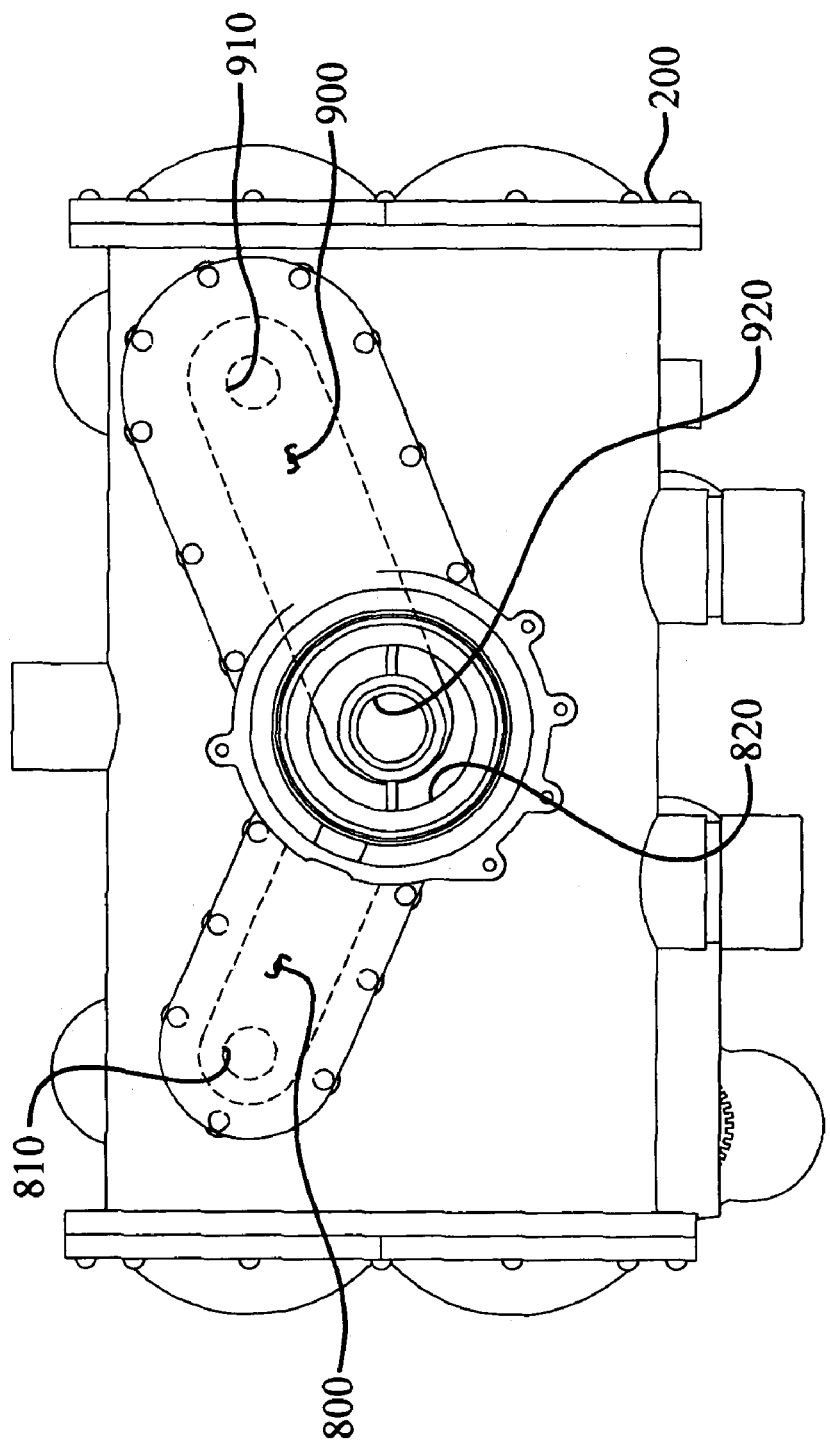
FIG. 4 is a bottom plan view of the water control valve of FIG. 2 showing the central and perimeter ports, not to scale.

With reference now to FIGS. 2 and 3, the water control valve (100) has a housing (200) which encloses five chambers, namely: an influent chamber (300), a backwash chamber (600), a fast rinse chamber (1000), an effluent chamber (1300), and a discharge chamber (1600), collectively referred to as "the chambers," as best seen in FIG. 3. The housing (200) also encloses five valves, collectively referred to as "the housing valves," namely: a supply valve (400), a backwash valve (700), an outlet valve (1200), a fast rinse valve (1400), and a bypass valve (1500). Finally, the housing (200) has a perimeter passageway (800) and a central passageway (900), as seen in FIG. 4, that will be described in more detail later. The housing (200) of the water control valve (100) may be made of any material suitable for containing the fluid being controlled. In the case of water, and by way of example and not limitation, the housing (200) may be polyvinyl chloride (PVC), polypropylene (PP), acrylonitrile-butadiene-styrenes (ABS), or other plastic material made by injection molding, thermoforming, extrusion, or other acceptable plastic forming process. Alternatively, the housing (200) may be virtually any corrosion resistant material.

In one embodiment of the instant invention, as seen in FIG. 3, the influent chamber (300) has an influent source port (320) for receiving the untreated water (10) from a public water utility, a water well, or other water source. The influent source port (320) may fluidly connect to metallic or plastic piping that delivers the untreated water (10) to the water control valve (100). The influent chamber (300) is in fluid communication with the supply valve (400) and the bypass valve (1500). The backwash chamber (600) is in fluid communication with the supply valve (400) and the backwash valve (700). The discharge chamber (1600) has a discharge port (1610), and the discharge chamber (1600) is in fluid communication with the backwash valve (700) and the fast rinse valve (1400). The fast rinse chamber (1000) is in fluid communication with the outlet valve (1200) and the fast rinse valve (1400). The effluent chamber (1300) has an effluent port (1320) for distributing the treated water (20), or untreated water (10), as will be discussed in more detail below. Like the influent source port (320), the effluent port (1320) may be fluidly connected to metallic or plastic piping that directs water away from the water control valve (100). The effluent chamber (1300) is in fluid communication with the outlet valve (1200) and the bypass valve (1500).

Referring now to FIG. 4, the perimeter passageway (800) has a backwash port (810) and a perimeter port (820). As seen in FIG. 3, the backwash port (810) is in fluid communication with the backwash chamber (600) and the perimeter port (820) provides fluid communication with the treatment tank (30). Similarly, the central passageway (900) has a fast rinse port (910) and a central port (920). The fast rinse port (910) is in fluid communication with the fast rinse chamber (1000) and the central port (920) is in fluid communication with the treatment tank (30). As seen in FIG. 4, the central port (920) resides within and is concentric to the perimeter port (820). The concentric relationship of the central port (920) and the perimeter port (810) allows the water control valve (100) to be attached to a concentric fitting on the treatment tank (30). Generally, the size of the connection is generally 2.5 inches NPTSM but the connection could be adapted to larger and to smaller connections, and the treatment tanks can be virtually any size.

Each of the housing valves has an open position and a closed position thereby providing control and routing of the water flow inside the housing (200). With reference again to FIG. 3, when the supply valve (400) is open, the influent chamber (300) is in fluid communication with the backwash chamber (600), and when the supply valve (400) is closed, water is substantially prevented from flowing from the influent chamber (300) to the backwash chamber (600). When the backwash valve (700) is open, the backwash chamber (600) is in fluid communication with the discharge chamber (1600), and when the backwash valve (700) is closed, water is substantially prevented from flowing from the backwash chamber (600) to the discharge chamber (1600). When the outlet valve (1200) is open, the fast rinse chamber (1000) is in fluid communication with the effluent chamber (1300), and when the outlet valve (1200) is closed, water is substantially prevented from flowing from the fast rinse chamber (1000) to the effluent chamber (1300). When the fast rinse valve (1400) is open, the discharge chamber (1600) is in fluid communication with the fast rinse chamber (1000), and when the fast rinse valve (1400) is closed, water is substantially prevented from flowing from the discharge chamber (1600) to the fast rinse chamber (1000). Furthermore, when the bypass valve (1500) is open, the influent chamber (300) is in fluid communication with the effluent chamber (1300), and when the bypass valve (1500) is closed, water is substantially prevented from flowing from the influent chamber (300) to the effluent chamber (1300).

Figure 5:
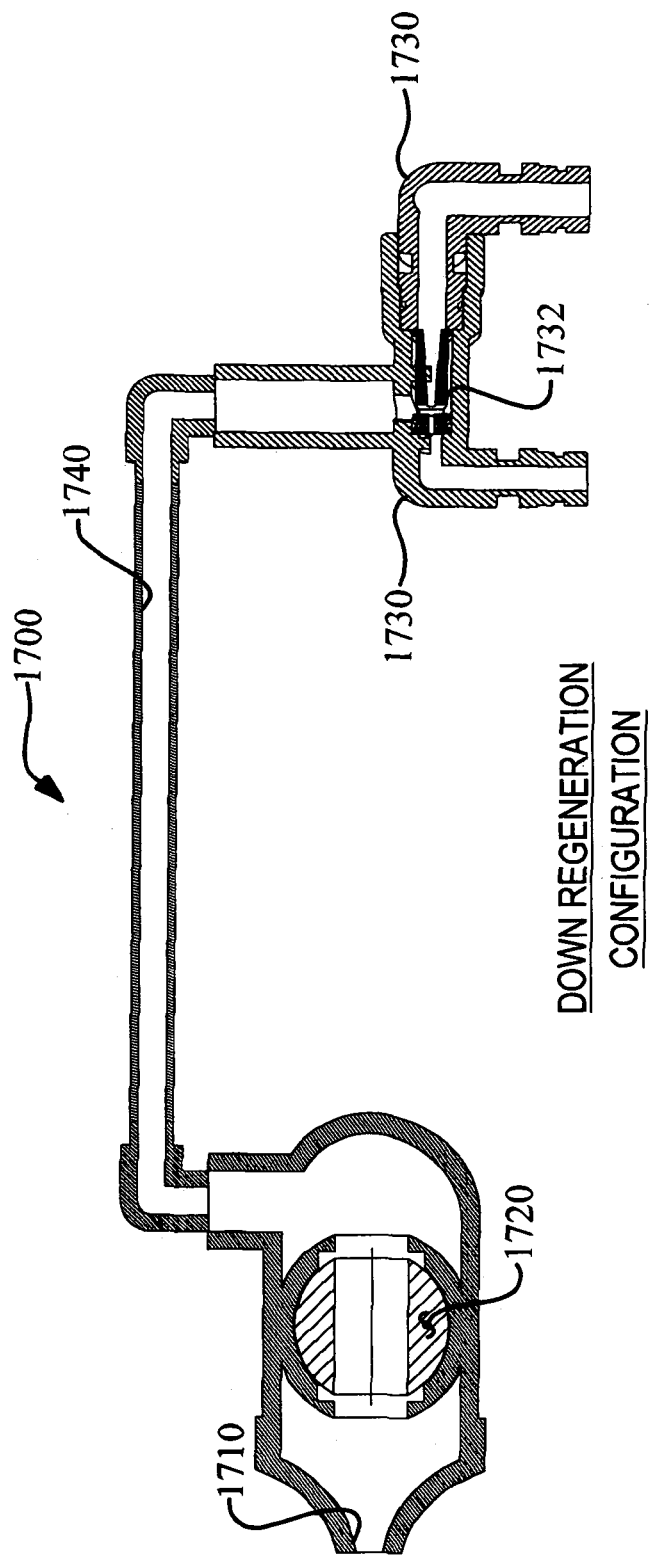
FIG. 5 is a cross-sectional view of the regeneration injection assembly taken along to section line 5-5 in FIG. 2, not to scale.

As previously mentioned, the water control valve (100) may operate to regenerate the media (35), seen in FIG. 1. In an embodiment of the instant invention, as seen in FIGS. 2 and 5, H the water control valve (100) includes a regeneration injection assembly (1700) which operatively connects the housing (200) to the regeneration agent reservoir (60). The injection assembly (1700) has a regeneration connection port (1710), a regeneration valve (1720), a regeneration connector (1730), and a regeneration passageway (1740). The regeneration valve (1720), together with the five housing valves, are referred to collectively as "the valves."

In an embodiment having the regeneration injection assembly (1700), there are two configurations for operatively connecting the regeneration injection assembly (1700) to the housing (200). As will be discussed in more detail below, the water flow through the water control valve may be different for the two configurations. With continued reference to FIGS. 2, 3, and 5, in one embodiment of the instant invention referred to as the down regeneration configuration, the regeneration connector (1730) is in fluid communication with the influent chamber (300) having an influent routing port (310) and the backwash chamber (600) having a backwash injection port (610). Specifically, the regeneration injection assembly (1700) is connected to the housing (200) at the influent routing port (310) and the backwash injection port (610). Furthermore, the regeneration connection port (1710) is in fluid communication with the regeneration agent reservoir (60), the regeneration valve (1720) is in fluid communication with the regeneration connection port (1710) and the regeneration passageway (1740), and the regeneration passageway (1740) is in fluid communication with the regeneration connector (1730). Like the housing valves, the regeneration valve (1720) has an open position and a closed position. When the regeneration valve (1720) is open, the regenerating agent (50) may flow from the regeneration agent reservoir (60) through the regeneration passageway (1740) to the regeneration connector (1730), and when the regeneration valve (1720) is in closed, the regenerating agent (50) is substantially prevented from flowing from the regeneration agent reservoir (60) through the regeneration passageway (1740) to the regeneration connector (1730). As seen in FIG. 5, the regeneration connector (1730) contains a regeneration agent injector (1732).

In one embodiment of the present invention, the regeneration agent injector (1732) is a venturi device such that when the untreated water (10) flows from the influent chamber (300) through the regeneration connector (1730) into the backwash chamber (600), the untreated water (10) flows through the regeneration agent injector (1732) creating a vacuum in the regeneration connector (1730). The vacuum may be a pressure difference or pressure drop between the regeneration passageway (1740) and the regeneration connector (1730) in the immediate vicinity of the regeneration agent injector (1732) such that the regeneration agent (50) flows out of the regeneration passageway (1740) into the regeneration connector (1730). The vacuum induces regeneration agent (50) flow into the regeneration agent connector (1730) and into the untreated water (10). As one skilled in the art will appreciate, other types of regeneration agent injectors (1732) may be incorporated to add controlled volumes of the regeneration agent (50) into the untreated water (10).

The unique arrangement of the chambers, the valves, and the passageways (800, 900) provides fluid communication between adjacent components. As one skilled in the art will observe and appreciate, the valves may be individually and independently opened and closed to direct water in a variety of directions for various uses or treatments.

As will be appreciated by those skilled in the art, the valves may be any device capable of both allowing flow and substantially stopping the flow of water among the various chambers. By way of example, and not limitation, in one embodiment of the instant invention, the valves are ball valves as those commonly found in fluid routing and control systems. In another embodiment of the instant invention, the valves are butterfly valves which are also commonly utilized to throttle or stop fluid flow. The valves may also be plug valves, or virtually any quarter-turn valve variation.

During the operation of the water control valve (100), the valves are positioned to direct water flow into five defined cycles, namely: a service cycle, a backwash cycle, a fast rinse cycle, a regeneration cycle, and a regeneration refill cycle. Each cycle is characterized by a unique set of valve positions which will be described in the following paragraphs. The following descriptions are made without reference to importance or sequence of any kind.

Figure 6:
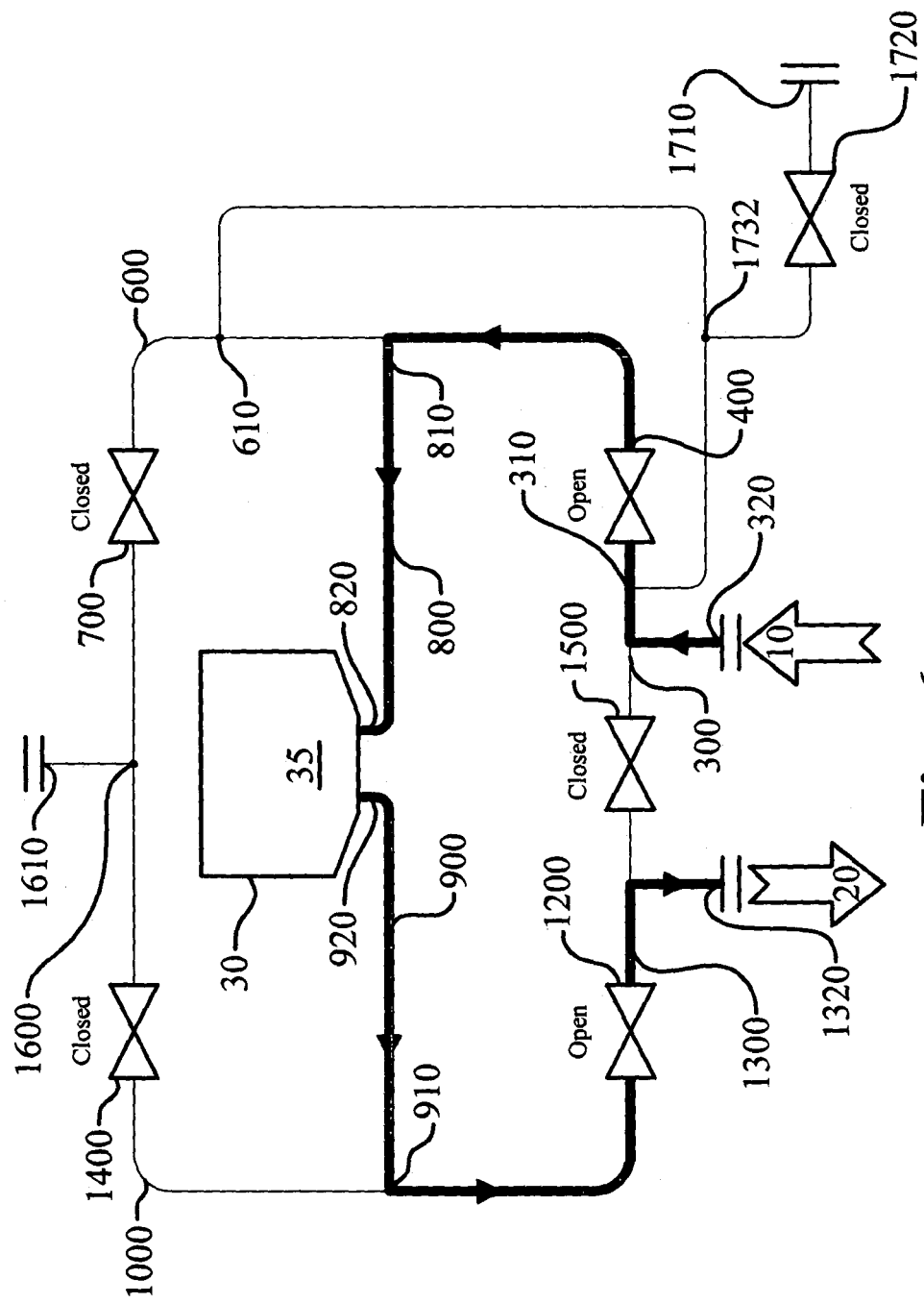
FIG. 6 is a schematic showing the flow of water with the valves in the positions shown in FIG. 3, not to scale.

The first cycle is the service cycle, seen in FIGS. 3 and 6. The purpose of the service cycle is to treat water for use. The housing valves direct incoming untreated water (10) through the treatment tank (30) for treatment and then distribute the treated water (20) to the point of use. During the service cycle the supply valve (400) is open, the backwash valve (700) is closed, the fast rinse-valve (1400) is closed, the outlet valve (1200) is open, and the bypass valve (1500) is closed. The flow path is best seen in FIG. 6. The untreated water (10) is directed from the influent source port (320) into the influent chamber (300) through the supply valve (400) and into the backwash valve (600), through the backwash port (810) and the perimeter passageway (800), through the perimeter port (820), and into the treatment tank (30). The media (35) treats the untreated water (10). Now, the treated water (20) flows out of the treatment tank (30) through the central port (920) and the central passageway (900), through the fast rinse port (910), into the fast rinse chamber (1000), through the outlet valve (1200), into the effluent chamber (1300), and out of the effluent port (1320) for use.

Figure 7:
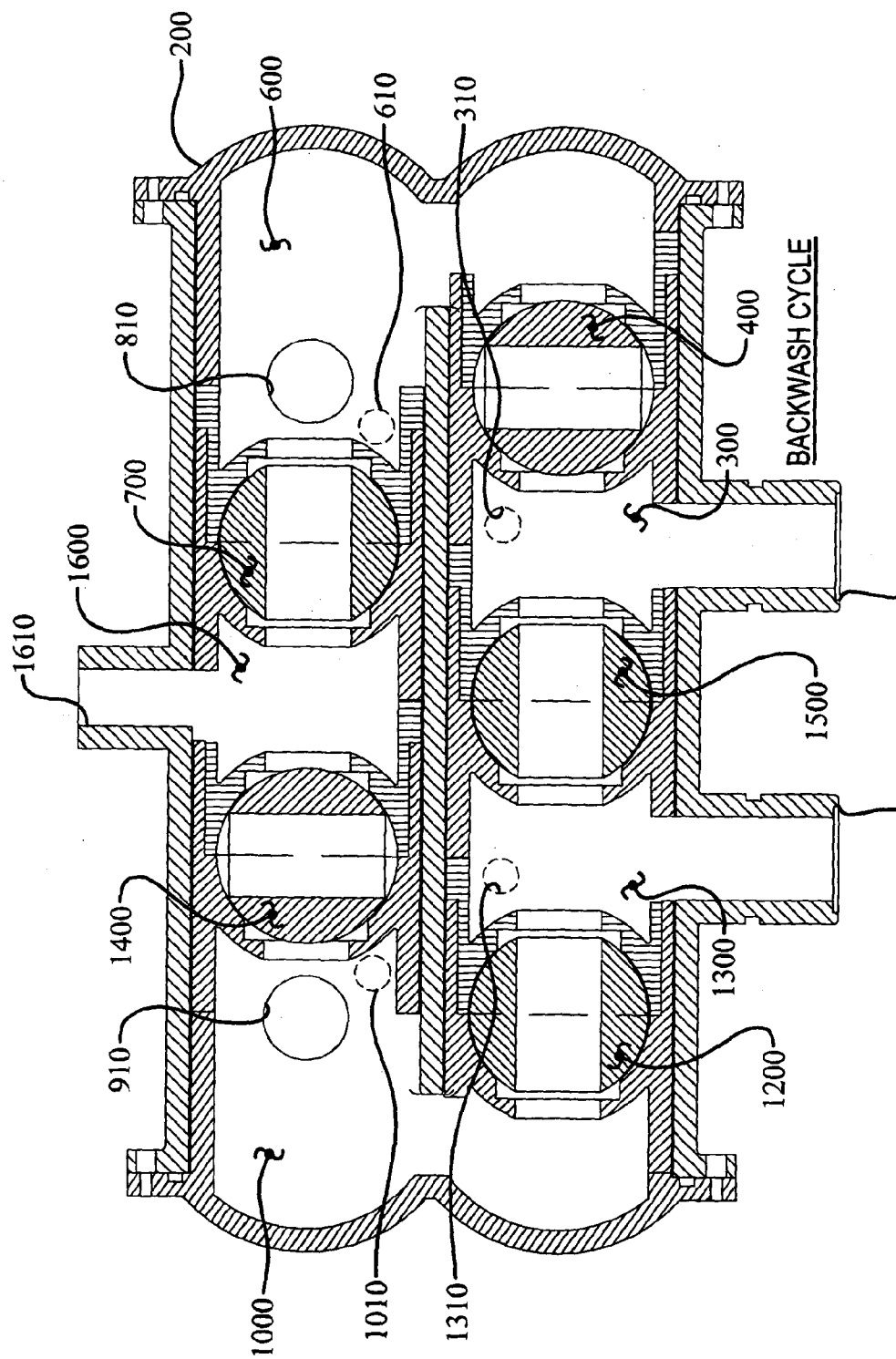
FIG. 7 is a cross-sectional view taken along section line 3-3 in FIG. 2 showing the valve positions for directing water in the backwash cycle, not to scale.
Figure 8:
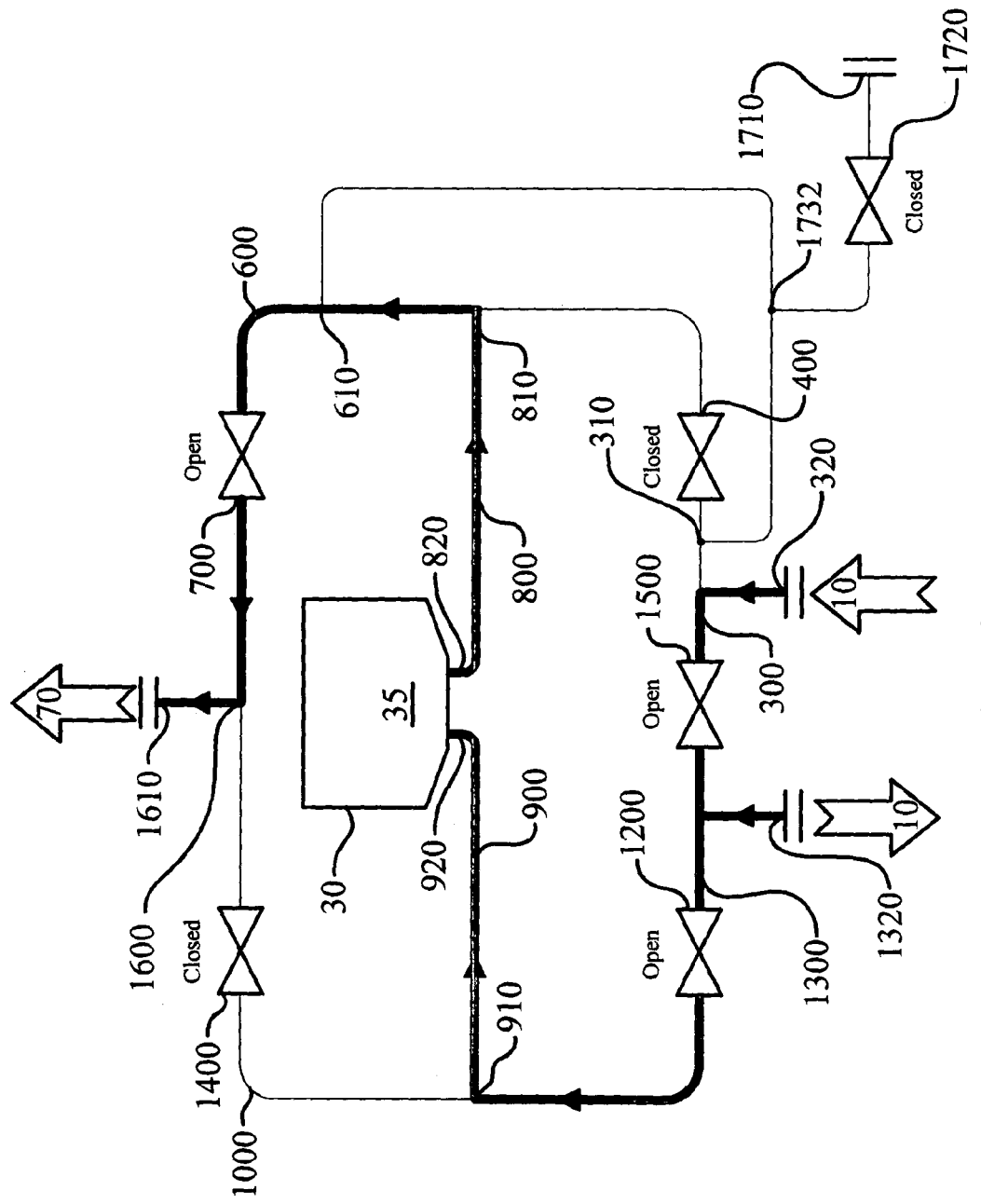
FIG. 8 is a schematic showing the flow of water with the valves in the positions shown in FIG. 7, not to scale.

The second cycle is the backwash cycle, seen in FIGS. 7 and 8. The purpose of the backwash cycle is to reverse the flow of water through the media (35) relative to the service cycle. The reversed water flow helps flush away any macroscopic contaminates that are trapped in the media (35). The backwash cycle may also redistribute the media (35) thereby erasing any channels that have formed in the media (35) during the service cycle. With reference now to FIGS. 7 and 8, during the backwash cycle, the supply valve (400) is closed, the backwash valve (700) is open, the fast rinse valve (1400) is closed, the outlet valve (1200) is open, and the bypass valve (1500) is open. The untreated water (10) enters through the influent source port (320) into the influent chamber (300), flows through the bypass valve (1500) and into the effluent chamber (1300). At this point the untreated water (10) is then simultaneously directed through (a) the effluent port (1320) and out of the water control valve (100) as untreated water (10), as needed, and (b) the outlet valve (1200), into the fast rinse chamber (1000), through the fast rinse port (910), through the central passageway (900), through the central port (920), and into the treatment tank (30) for washing the media (35) of any sediment. The untreated water (10), including any sediment, passes through the perimeter port (820), into the perimeter passageway (800), through the backwash port (810), into the backwash chamber (600), through the backwash valve (700), into the discharge chamber (1600), and through the discharge port (1610) and into the drain (40) as waste water (70).

Figure 9:
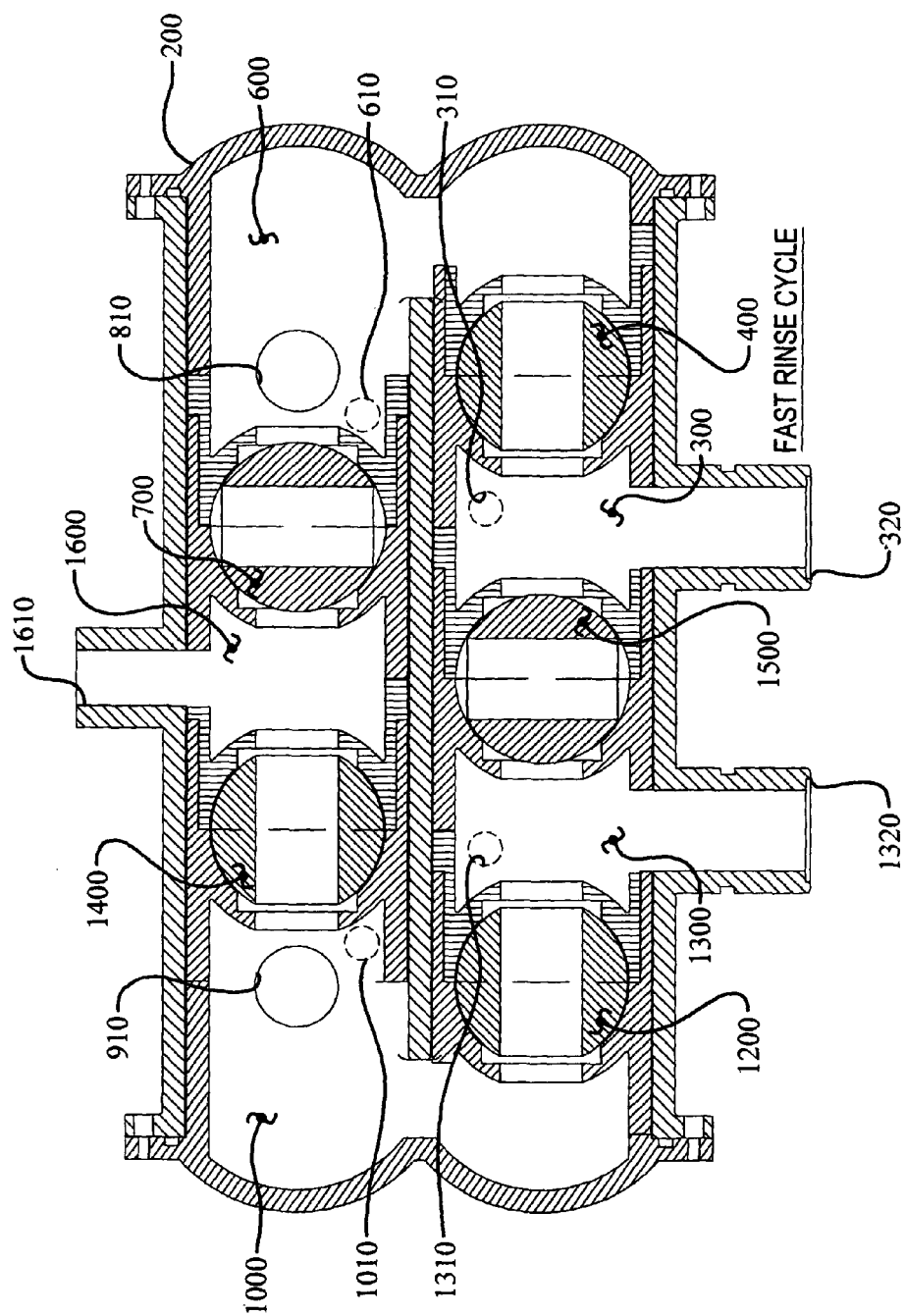
FIG. 9 is a cross-sectional view taken along section line 3-3 in FIG. 2 showing the valve positions for directing water in the fast rinse, cycle, not to scale.
Figure 10:
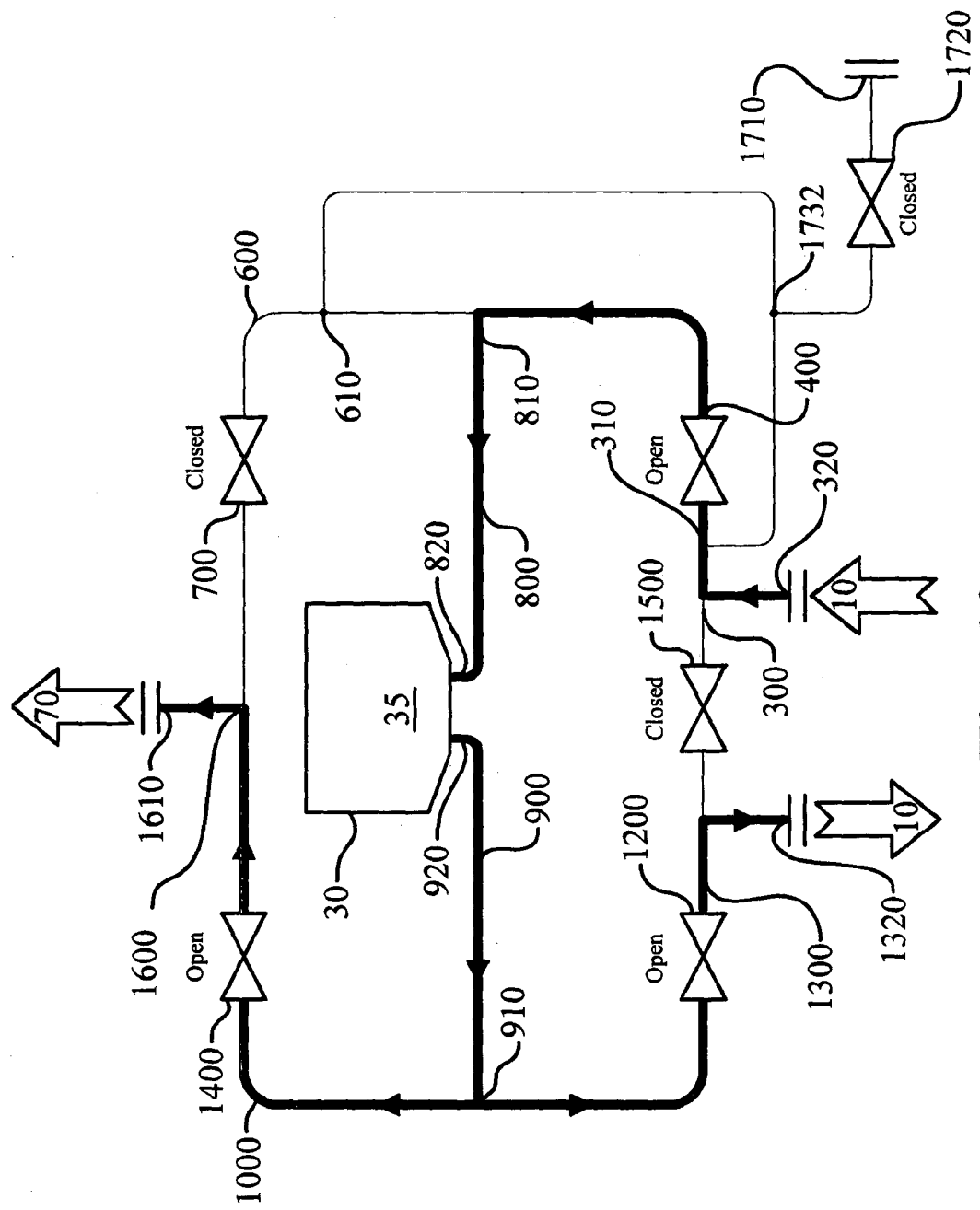
FIG. 10 is a schematic showing the flow of water with the valves in the positions shown in FIG. 9, not to scale.

A third cycle is the fast rinse cycle, seen in FIGS. 9 and 10. In some instances it is desirable to flow water through the media (35) in the same direction as the service cycle to repack, and flush the regeneration agent (50) from, the media (35). As seen in FIGS. 9 and 10, when the supply valve (400) is open, the backwash valve (700) is closed, the fast rinse valve (1400) is open, the outlet valve (1200) is open, and the bypass valve (1500) is closed, the untreated water (10) enters into the influent chamber (300) through the influent source port (320), best seen in FIG. 10. The untreated water (10) is then directed through the supply valve (400), into the backwash chamber (600), through the backwash port (810), through the perimeter passageway (800), through the perimeter port (820), and into the treatment tank (30) to rinse the media (35). The treated water (20) flows out of the treatment tank (30), through the central port (920), through the central passageway (900), through the fast rinse port (910), into the fast rinse chamber (1000), and then is simultaneously directed through (a) the outlet valve (1200), into the effluent chamber (1300), and out the effluent port (1320) as treated water (20), as needed, and (b) the fast rinse valve (1400), into the discharge chamber (1600), and out through the discharge port (1610) into the drain (40) as waste water (70).

Figure 11:
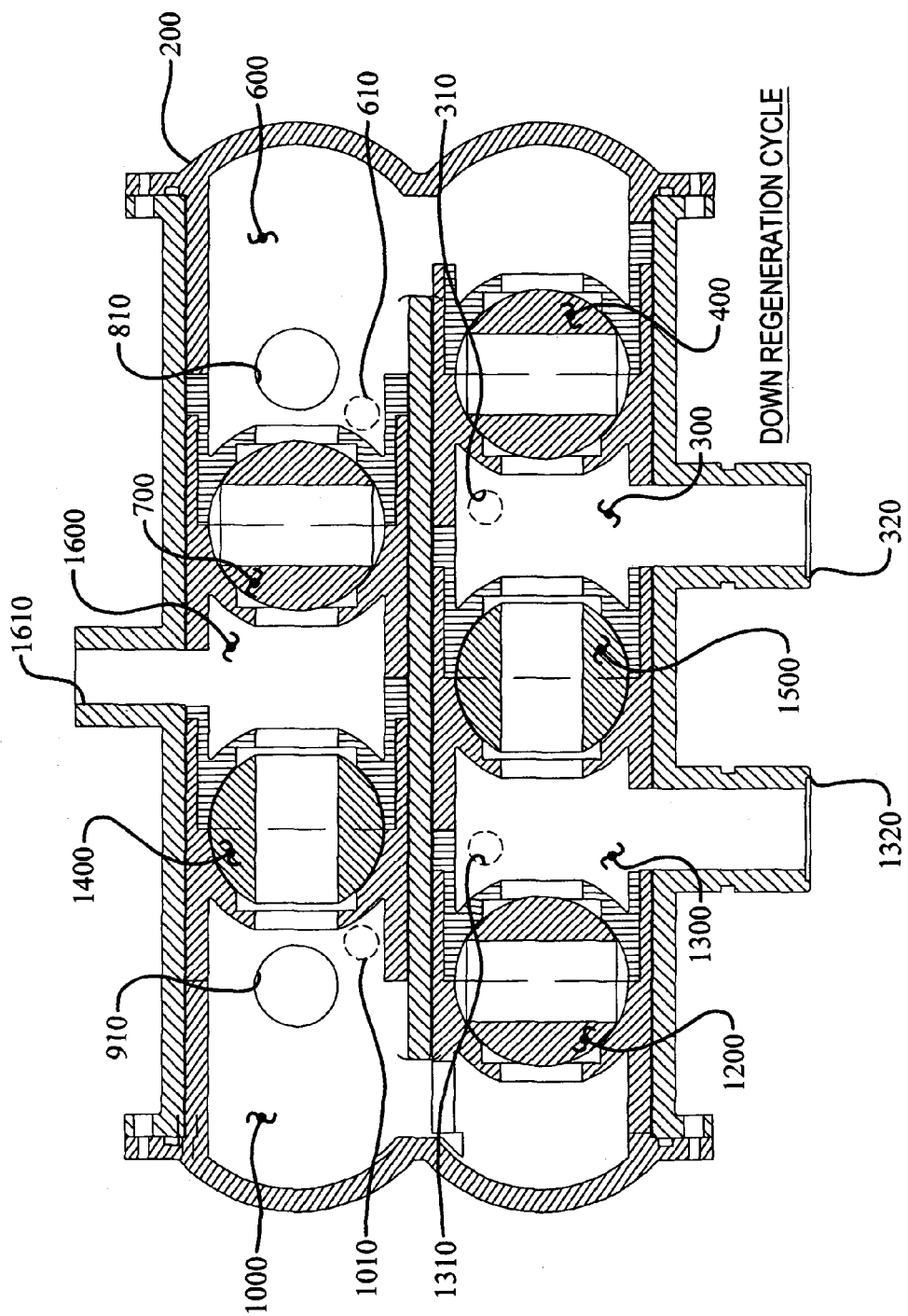
FIG. 11 is a cross-sectional view taken along section line 3-3 in FIG. 2 showing the valve positions for directing water in the down regeneration cycle, not to scale.
Figure 12:
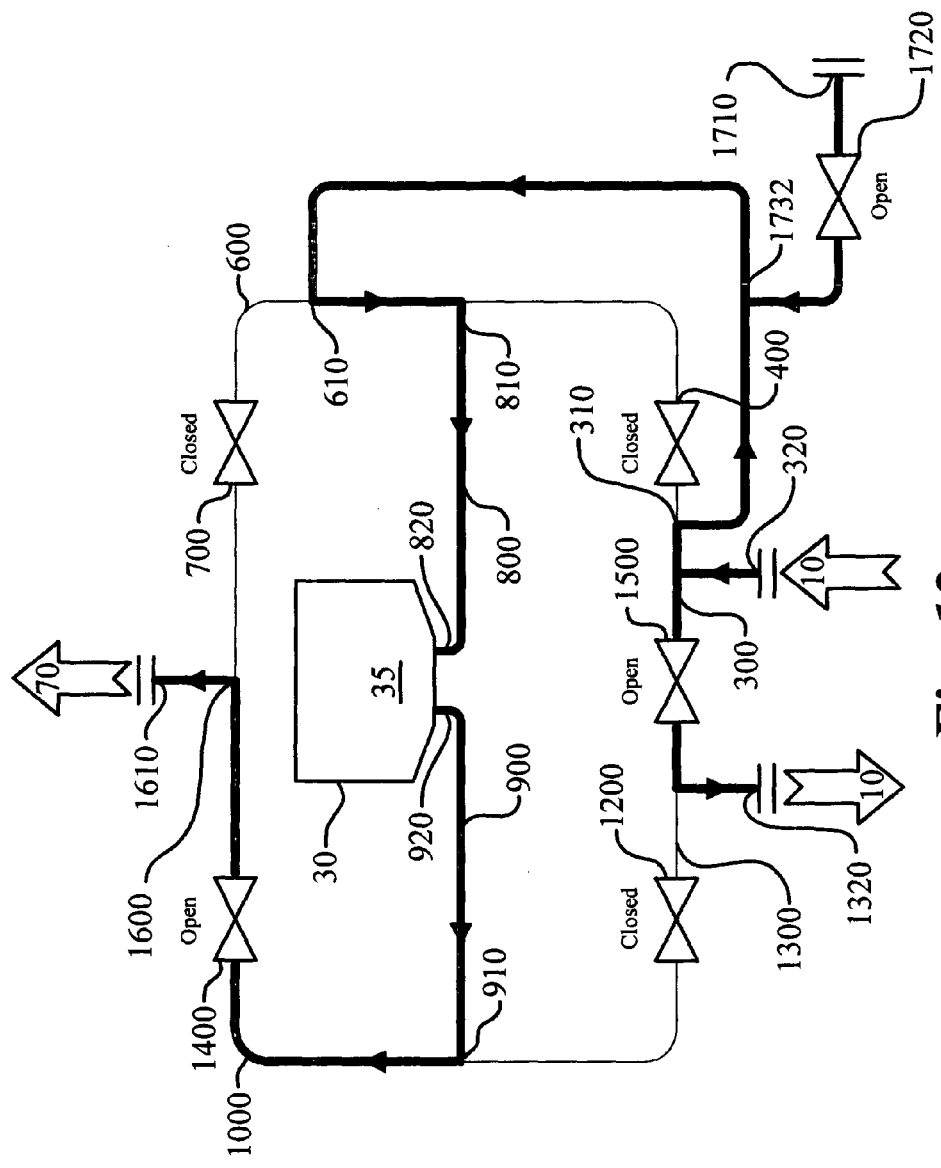
FIG. 12 is a schematic showing the flow of water with the valves in the positions shown in FIG. 1, not to scale.

A fourth cycle is the regeneration cycle which is sometimes referred to as "brining." The purpose of the regeneration cycle is to transfer the regeneration agent (50) from the regeneration agent reservoir (60) to the treatment tank (30), and more specifically, to the media (35). In another embodiment of the instant invention the configuration of the regeneration injection assembly (1700) determines the regeneration cycle water flow. As mentioned previously, the regeneration injection assembly (1700) has two configurations—the down regeneration configuration and the up regeneration configuration. The regeneration cycle in the down regeneration configuration is seen in FIGS. 11 and 12. With reference to FIG. 11, the valves are in the following positions during the down regeneration cycle: the supply valve (400) is closed, the backwash valve (700) is closed, the fast rinse valve (1400) is open, the outlet valve (1200) is closed, the bypass valve (1500) is open, and the regeneration valve (1720) is open, best seen in FIG. 5. A schematic of the water flow with the valves in these positions is seen in FIG. 12. The untreated water (10) enters into the influent chamber (300) through the influent source port (320) and then is simultaneously directed through two paths. The first path supplies untreated water (10) to the point of use, as needed, by flowing through the bypass valve (1500) into the effluent chamber (1300) and out of the water control valve (100) through the effluent port (1320). The second path is to the regeneration injection assembly (1700) via the influent routing port (310) and into the regeneration connector (1730) then through the regeneration agent injector (1732), where the regeneration agent (50) is added. The water together with the regeneration agent (50) is directed through the backwash injector port (610) into the backwash chamber (600), through the backwash port (810), through the perimeter passageway (800), through the perimeter port (820), and into the treatment tank (30) to regenerate the media (35). The water plus any residual regeneration agent (50) flows out of the treatment tank (30), through the central port (920), through the central passageway (900), through the fast rinse port (910) and into the fast rinse chamber (1000), through the fast rinse valve (1400), into the discharge chamber (1600), and out the discharge port (1610) and into the drain (40) as waste water (70).

Figure 13:
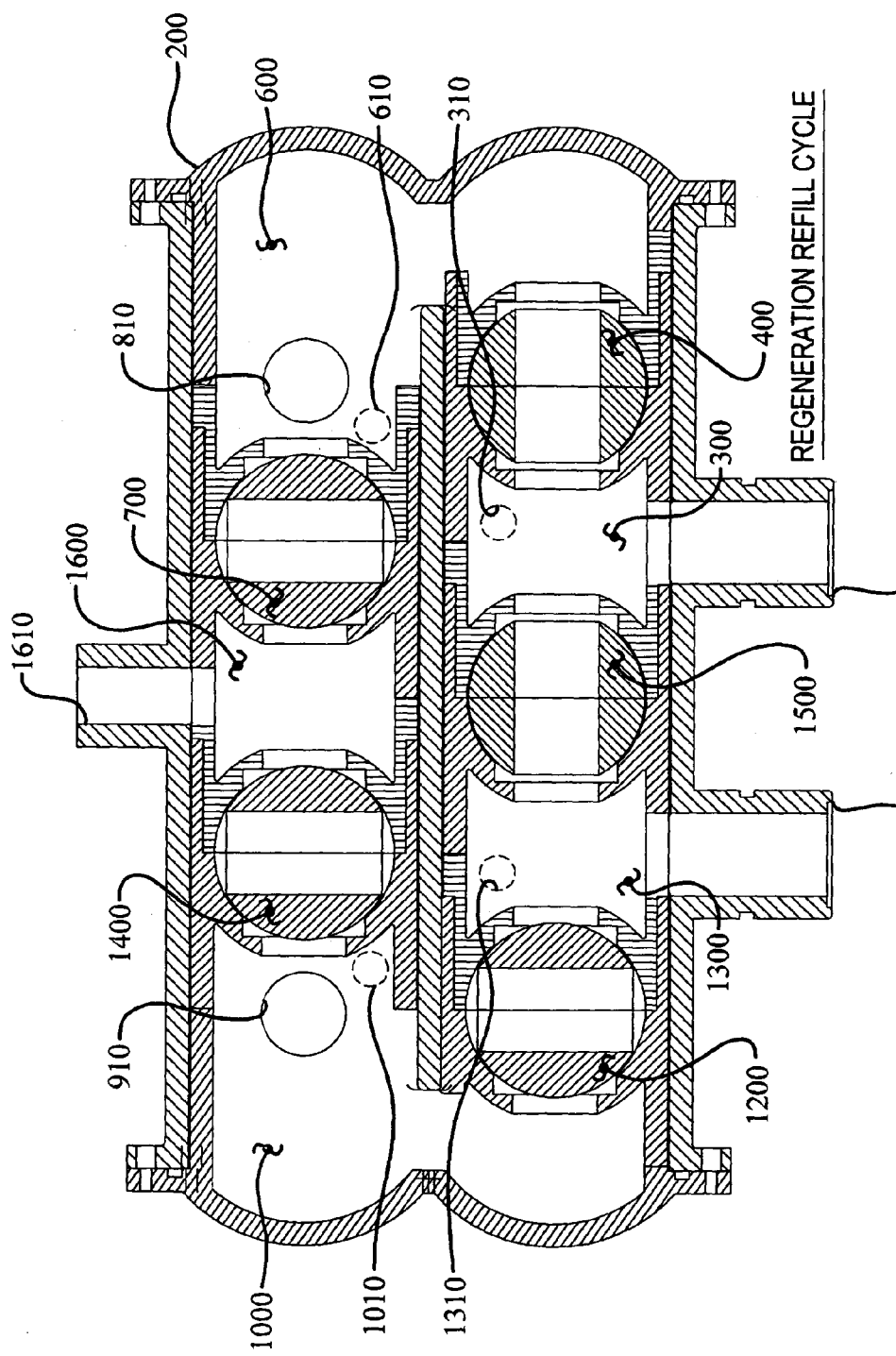
FIG. 13 is a cross-sectional view taken along section line 3-3 in FIG. 2 showing the valve positions for directing water in the regeneration refill cycle, not to scale.
Figure 14:
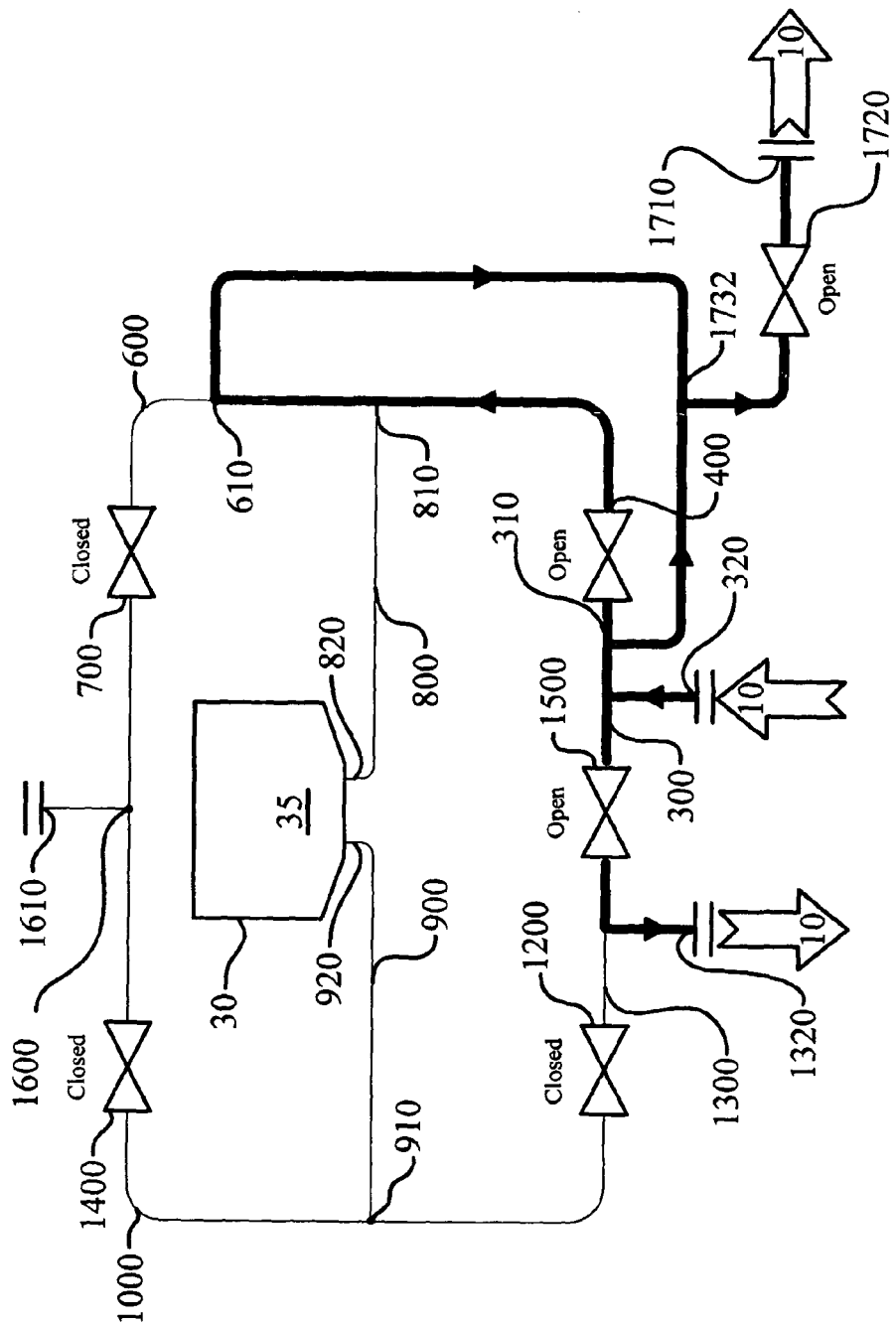
FIG. 14 is a schematic showing the flow of water with the valves in the positions shown in FIG. 13, not to scale.

As, previously described, the regeneration reservoir (60) stores the regeneration agent (50). In the embodiment where the water control valve (100) controls water for water softening, the regeneration agent (50) may be a brine solution. Usually there are two ingredients required to make the brine solution. One is water. The other is a salt. Generally the salt is in the form of sodium chloride, though potassium chloride is sometimes used. The water and the salt are mixed in the regeneration reservoir (60). After repeated regeneration cycles, the regeneration reservoir (60) will be emptied of the regeneration agent (50). Typically, regeneration reservoirs (60) range in size from 12 inches by 24 inches to 96 inches by 144 inches and may hold from 10 to 5,000 pounds of salt. The water control valve (100) is designed to direct water flow to the regeneration reservoir (60) to refill it with water when necessary, thus automatically supplying one of the ingredients for making the regeneration agent (50). As seen in FIG. 13 and 14, during the down regeneration refill cycle, the supply valve (400) is open, the backwash valve (700) is closed, the fast rinse valve (1400), is closed, the outlet valve (1200) is closed, the bypass valve (1500) is open, and the regeneration valve (1720), seen in FIG. 5, is open. The water flow is best seen in FIG. 14. The untreated water (10) is directed from the influent source port (320) through three paths. One path is through the supply valve (400) and into the backwash chamber (600), through the backwash injection port (610) into the regeneration connector (1730). The second path is into the regeneration injection assembly (1700) through the influent injection port (310) and into the regeneration connector (1730), then through the regeneration agent injector (1732), into the regeneration passageway (1740), through the regeneration valve (1720) and regeneration port (1710), and into the regeneration agent reservoir (60). Finally, the bypass valve (1500) is opened to supply untreated water (10) into the effluent chamber (1300) and out the effluent port (1320), as needed.

Figure 15:
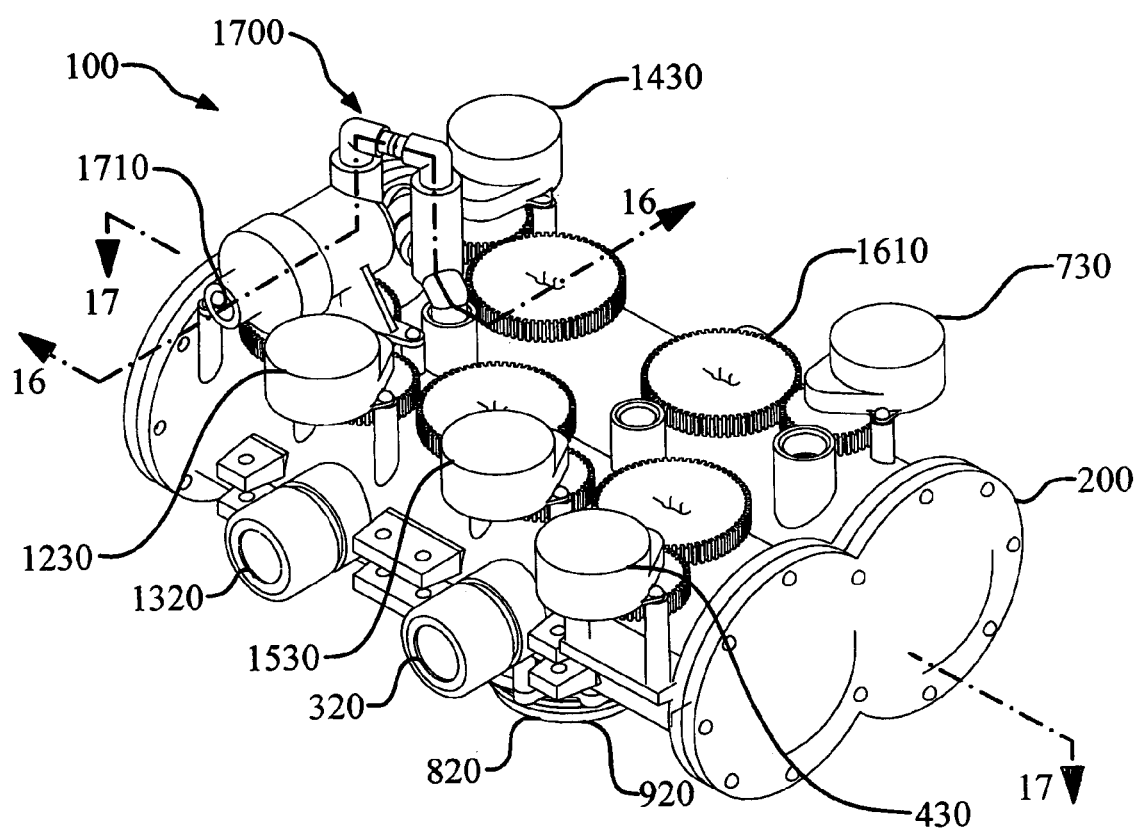
FIG. 15 is an isometric view of an embodiment of a water control valve with a regeneration injection assembly in the up regeneration configuration, not to scale.
Figure 16:
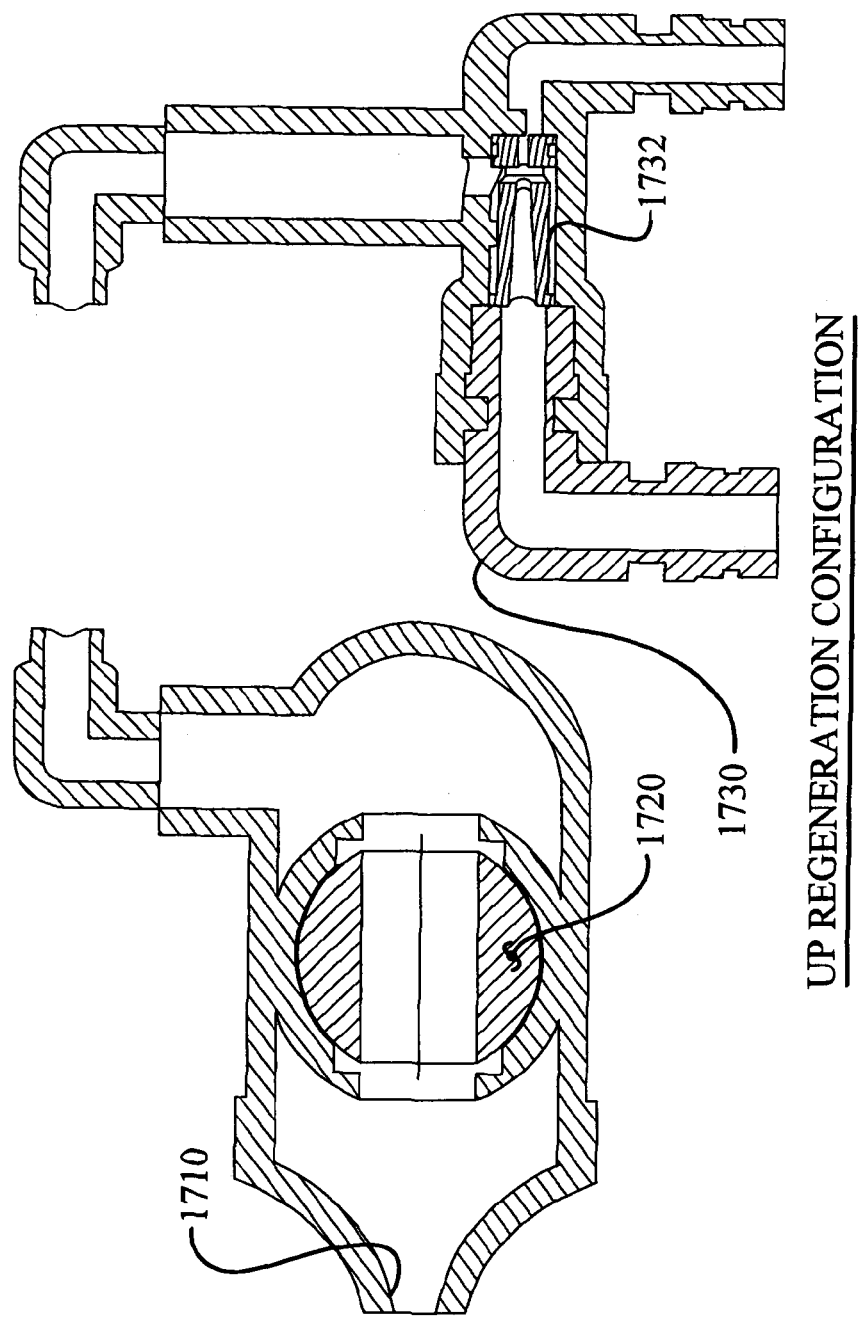
FIG. 16 is a cross-sectional view of the regeneration injection assembly taken along section line 16-16 in FIG. 15, not to scale.
Figure 17:
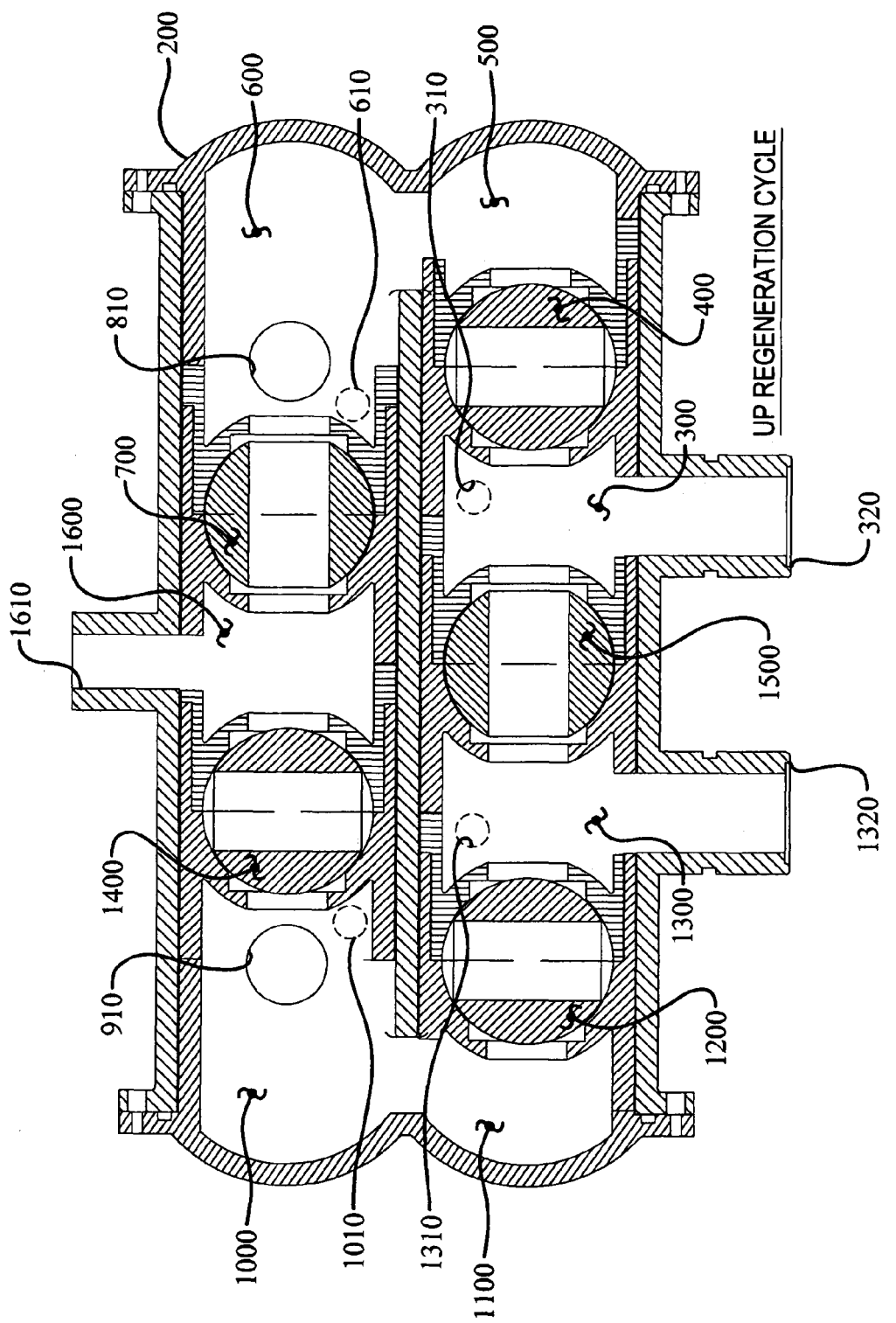
FIG. 17 is a cross-sectional view taken along section line 17-17 in FIG. 15 showing the valve positions for directing water in the up regeneration cycle, not to scale.

In another embodiment of the instant invention, as seen in FIGS. 15, 16, and 17, the regeneration injection assembly (1700) is positioned in the up regeneration configuration. The regeneration injection assembly (1700) is in fluid communication with the effluent chamber (1300) having an effluent routing port (1310) and the fast rinse chamber (1000) having a fast rinse injection port (1010). Specifically, the regeneration connector (1730) is in fluid communication with the effluent routing port (1310) and the fast rinse injection port (1010). Referring now to FIGS. 16 and 17, during the up regeneration cycle, when the regeneration injection assembly (1700) is attached to the housing (200), the untreated water (10) flows from the effluent chamber (1300) through the effluent routing port (1310) into the regeneration connector (1730) through the regeneration agent injector (1732), through the fast rinse injection port (1010) and into the fast rinse chamber (1000). In one embodiment of the instant invention, and by way of example and not limitation, the regeneration agent injector (1732) is a venturi device. The water flow through the, venturi generates a vacuum in the regeneration connector (1730) thereby drawing the regeneration agent (50) from the regeneration passageway (1740) into the regeneration connector (1730) or, more specifically into the water flow.

The water flow in the regeneration cycle when the water control valve (100) is configured to the up regeneration configuration is different than when the water control valve (100) is configured in the down regeneration configuration. When the water control valve (100) is in the up regeneration configuration and the water control valve (100) cycles to the up regeneration cycle, the valves, as seen in FIGS. 16 and 17, are positioned as follows: the supply valve (400) is closed, and the backwash valve (700) is open, and the fast rinse valve (1400) is closed, and the outlet valve (1200) is closed, and the bypass valve (1500) is open, and the regeneration valve (1720) is open. The water flow is best seen in FIG. 18.

Figure 18:
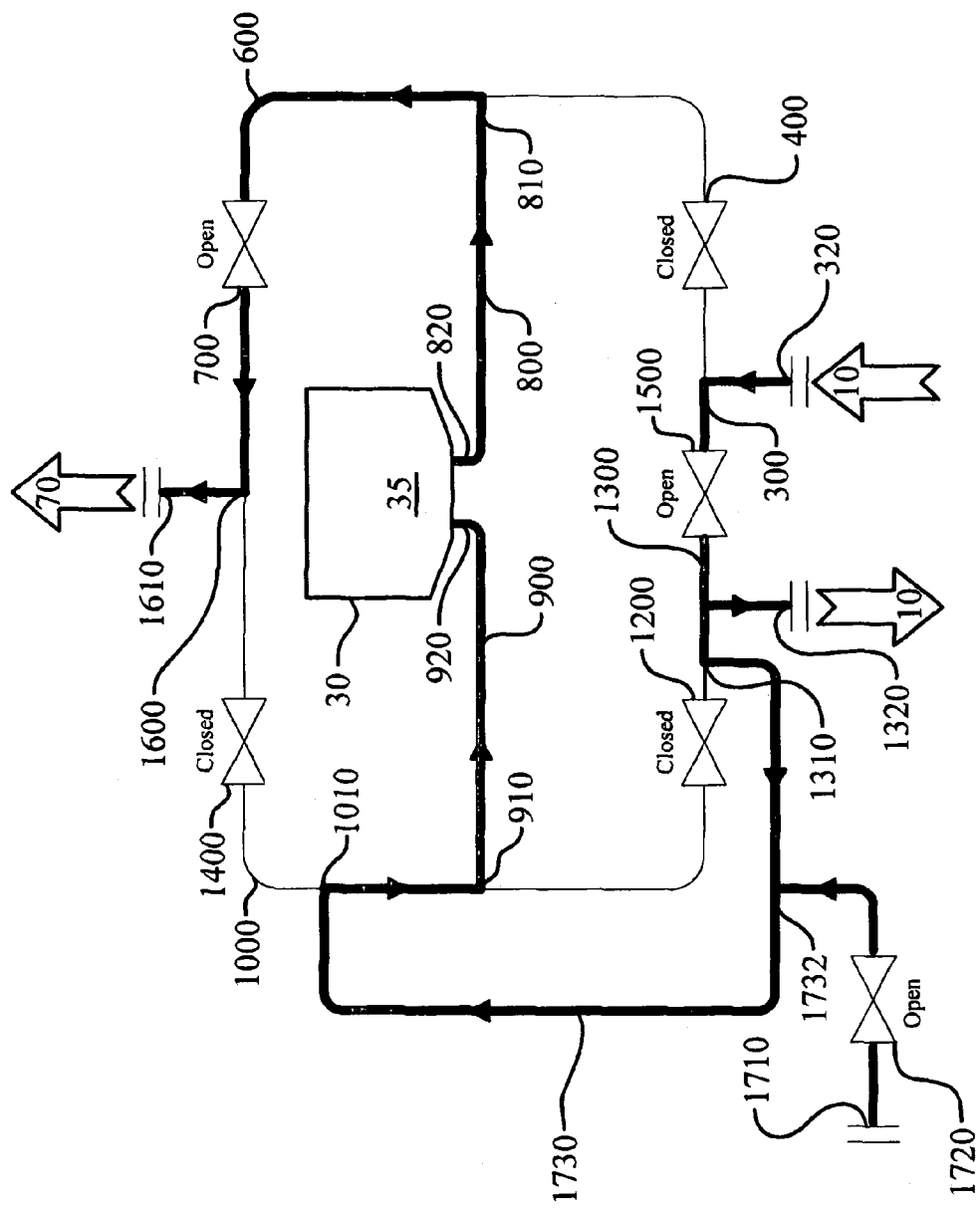
FIG. 18 is a schematic showing the flow of water with the valves in the positions shown in FIG. 17, not to scale.

Referring now to FIG. 18, the untreated water (10) enters into the influent chamber (300) through the influent source port (320). The water proceeds through the bypass valve (1500) into the effluent chamber (1300) and is then simultaneously directed through two paths. The first path is out through the effluent port (1320) for distribution. That is, untreated water (10) is supplied to the point of use, as needed, while the media (35) is regenerated. The second path is to the regeneration injection assembly (1700) through the effluent routing port (1310) into the regeneration connector (1730) and through the regeneration agent injector (1732). The regeneration agent (50) is added, then the water carrying the regeneration agent (50) passes through the fast rinse injector port (1010) into the fast rinse chamber (1000), through the fast rinse port (910), through the central passageway (900), through the central port (920), and into the treatment tank (30) to regenerate the media (35). The water with any residual regeneration agent (50) flows out of the treatment tank (30) through the perimeter port (820) and the perimeter passageway (800), through the backwash port (810), into the backwash chamber (600), through the backwash valve (700), into the discharge chamber (1600), and out the discharge port (1610) to the drain (40) as waste water (70).

Figure 19:
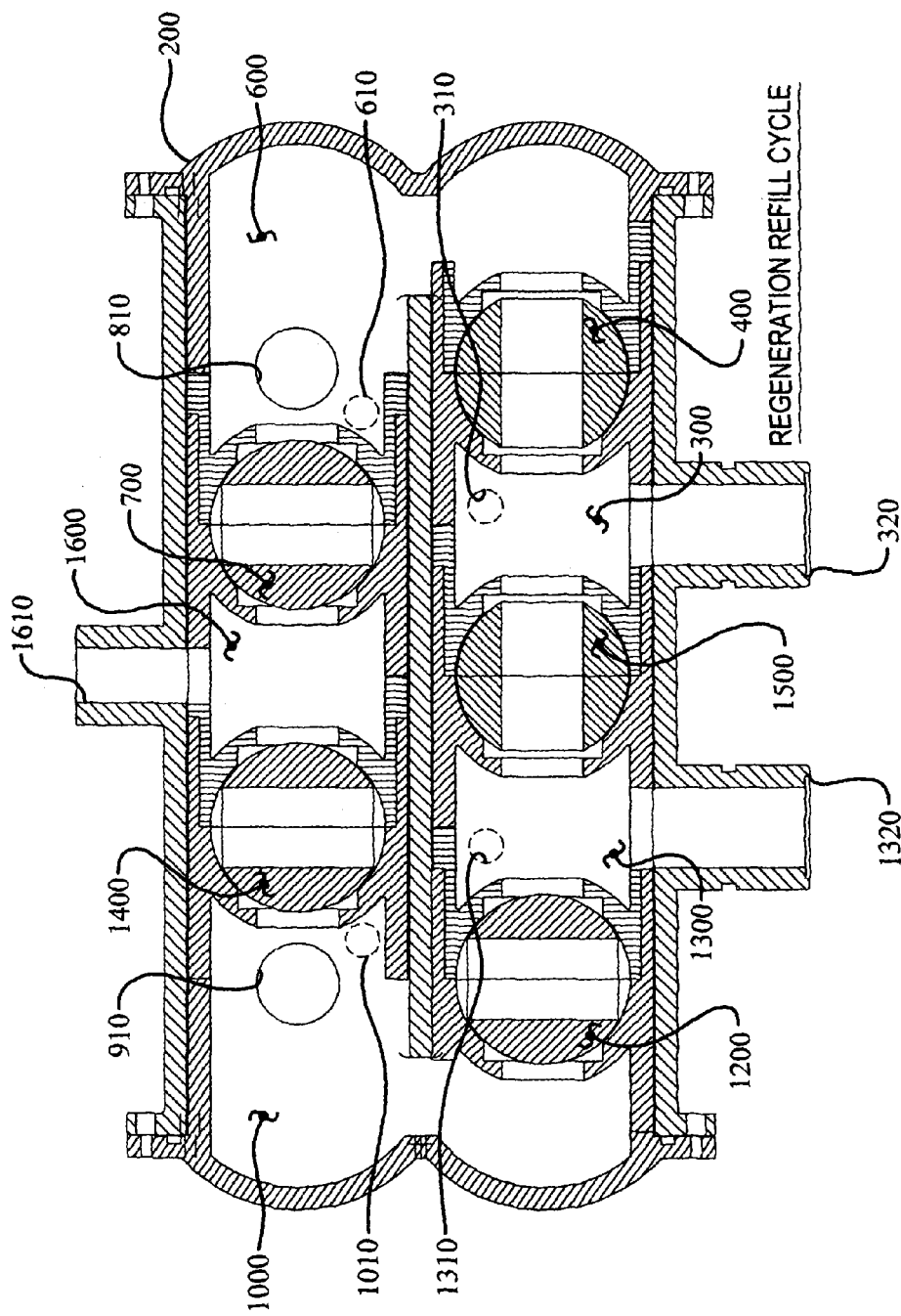
FIG. 19 is a cross-sectional view taken along section line 17-17 in FIG. 15 showing the valve positions for directing water in the regeneration refill cycle, not to scale.
Figure 20:
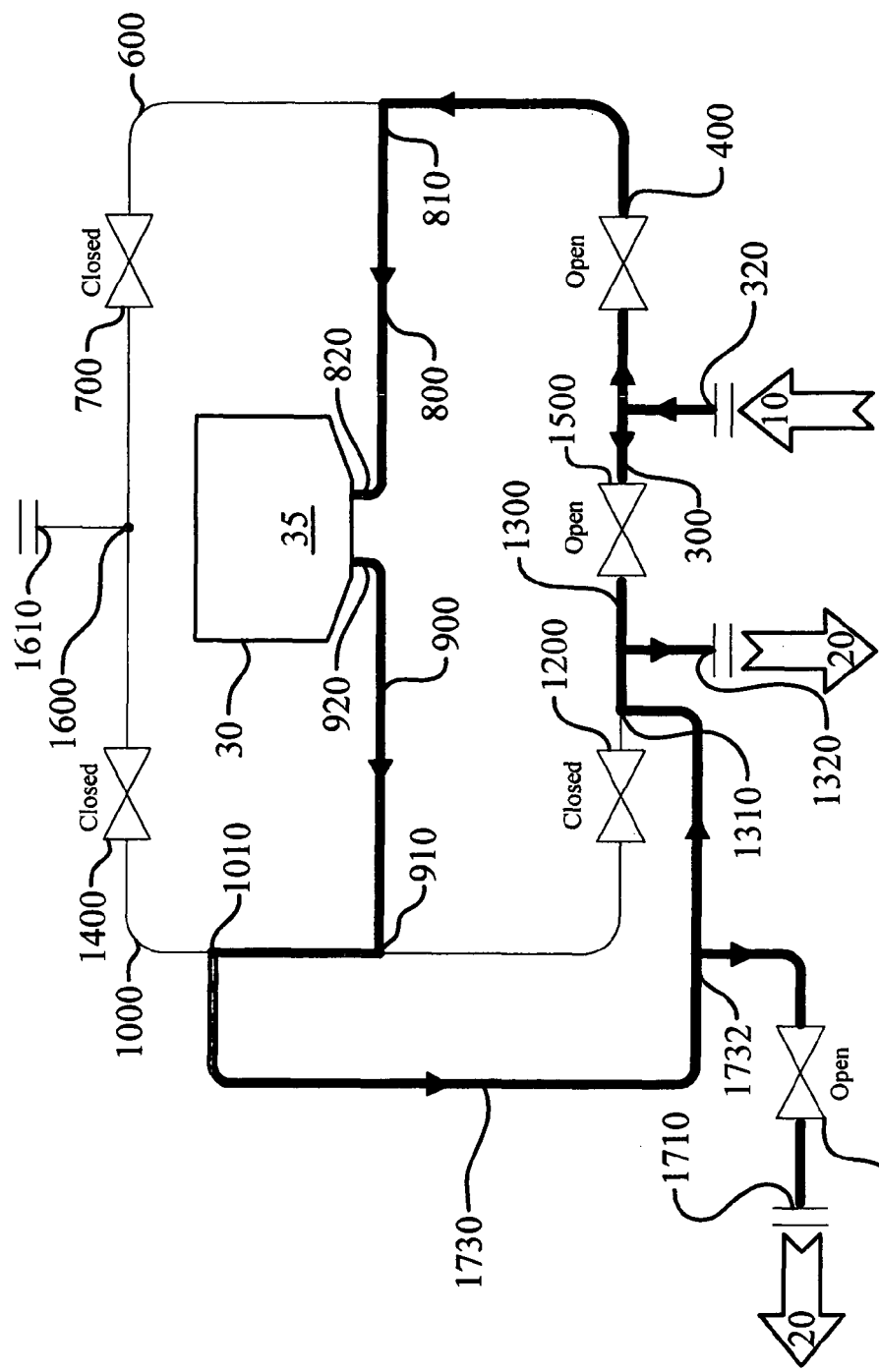
FIG. 20 is a schematic showing the flow of water with the valves in the positions shown in FIG. 19, not to scale.

As with the regeneration cycle, the water flow through the water control valve (100) in the up regeneration configuration also differs from the down regeneration configuration during the up regeneration refill cycle. As seen in FIGS. 16 and 19, the positions of the valves in the up regeneration refill cycle is as follows: the supply valve (400) is open, the backwash valve (700) is closed, the fast rinse valve (1400) is closed, the outlet valve (1200) is closed, the bypass valve (1500) is open, and the regeneration valve (1720) is open. The untreated water (10) is directed according to the flow diagram seen in FIG. 20. From the influent source port (320) the water flows into the influent chamber (300) and then the water flows in two directions. One direction is through the supply valve (400) and into the backwash chamber (600), then through the backwash injection port (810), through the perimeter passageway (800), through the perimeter port (820), and into the treatment tank (30) for treatment. The treated water (20) flows out of the treatment tank (30) through the central port (920), through the central passageway (900), through the fast rinse port (910) into the fast rinse chamber (1000). From the fast rinse chamber (1000) the water flows through the fast rinse injection port (1010), into the regeneration connector (1730), and through the regeneration agent injector (1732). The water then flows into the regeneration passageway (1740), through the regeneration valve (1720) and regeneration port (1710), and refills the regeneration agent reservoir (60). The treated water (20) also flows into the effluent chamber (1300) and through the effluent port (1320) for use. The other direction is from the influent chamber (300) through the bypass valve (1500) and into the effluent chamber (1300) where the untreated water (10) blends with the treated water (20) and flows out of the effluent port (1320) for use.

Although five cycles for each of the up regeneration and down regeneration configurations have been defined, one skilled in the art will appreciate that the unique relationship between each of the valves permits a multitude of other flow cycles. One skilled in the art will also appreciate that the service, backwash, regeneration, fast rinse, and regeneration refill cycles may be arranged in any predetermined order, or as determined at any point in time as the situation dictates. In other words, the cycles may be put into any sequence and that sequence may be altered at any moment.

In another embodiment of the instant invention, as seen in FIGS. 2 and 15, the outlet valve (1200) and the regeneration valve (1720) are operatively connected, such that when the outlet valve (1200) is open, the regeneration valve (1720) is closed, and when then outlet valve (1200) is closed, the regeneration valve (1720) is open.

In another embodiment of the instant invention, as seen in FIG. 2 and 15, each of the housing valves has its own motor. For example, the supply valve (400) is rotatably joined to a supply motor (430), the backwash valve (700) is rotatably joined to a backwash valve motor (730), the fast rinse valve (1400) is rotatably joined to a fast rinse valve motor (1430), the bypass valve (1500) is rotatably joined a bypass valve motor (1530), and the outlet valve (1200) and the regeneration valve (1720) are rotatably joined to an outlet valve motor (1230).

Figure 21:
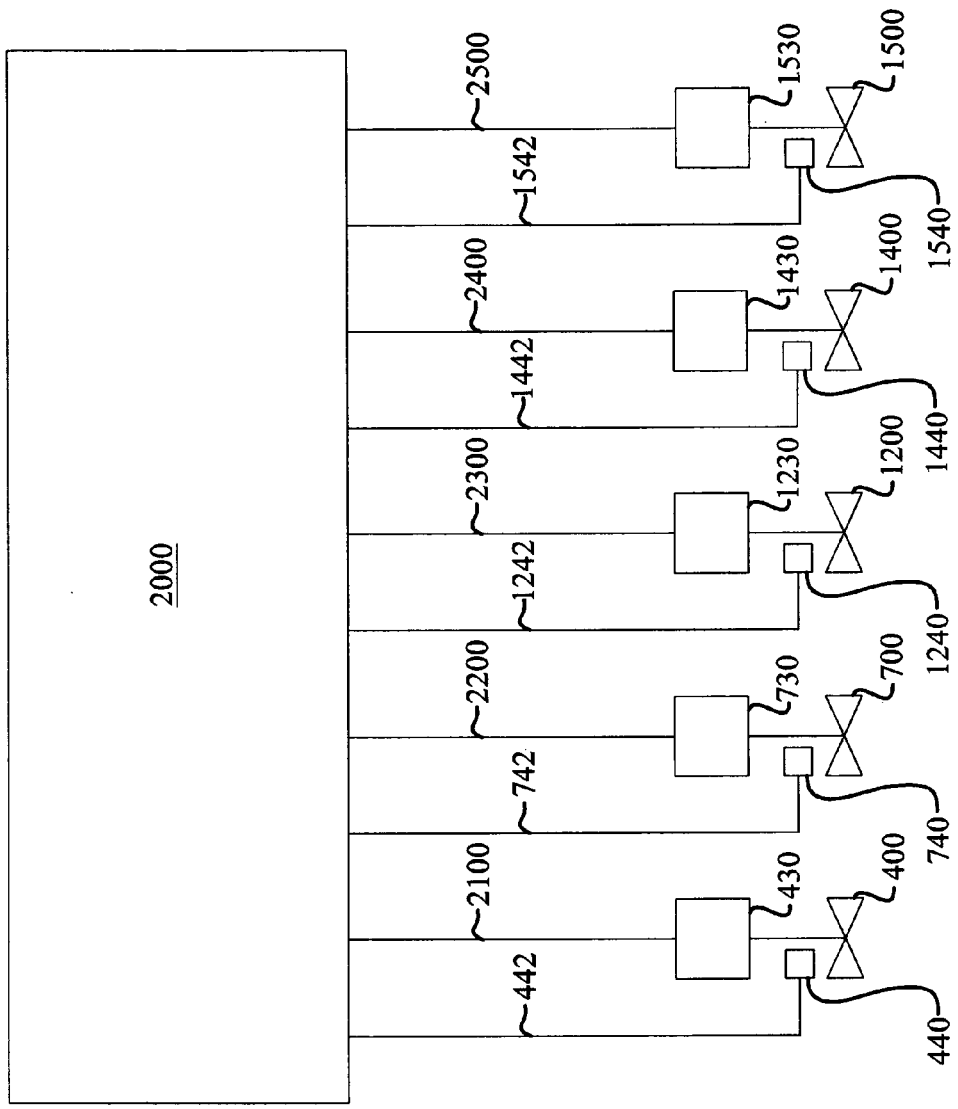
FIG. 21 is a schematic showing the valve signals of an embodiment, the programmable electronic controller, and the motor outputs from the programmable electronic controller.

As seen in FIG. 21, in another embodiment of the instant invention, each of the valves has a sensor. In particular, the supply valve (400) has a supply valve sensor (440) which generates a supply valve signal (442). Similarly, the backwash valve (700) has a backwash valve sensor (740) which generates a backwash valve signal (742), the outlet valve (1200) has an outlet valve sensor (1240) which generates an outlet valve signal (1242), the fast rinse valve (1400) has a fast rinse valve sensor (1440) which generates a fast rinse valve signal (1442), the bypass valve (1500) has a bypass valve sensor (1540) which generates a bypass signal (1542), and in the embodiment having a regeneration valve (1720), the regeneration valve (1720) has a regeneration valve sensor (1726) which generates a regeneration valve signal (1728). In another embodiment of the instant invention, the regeneration valve (1720) shares the outlet valve sensor (1240) with the outlet valve (1200). As one skill in the art will recognize, the valve sensors (440, 740, 1240, 1440, 1540, 1726) may be magnetic sensors, proximity sensors, or any sensor that generates an electrical signal or pulse in response to the movement or the position of the respective valve, thereby permitting the position of each valve to be known.

In another embodiment of the instant invention, with continued reference to FIG. 21, the water control valve (100) includes a programmable electronic controller (2000) having a supply valve motor output (2100) for controlling the supply valve motor (430), a backwash valve motor output (2200) for controlling the backwash valve motor (730), an outlet valve motor output (2300) for controlling the outlet valve motor (1230), a fast rinse valve motor output (2400) for controlling the fast rinse valve motor (1430), and a bypass valve motor output (2500) for controlling the bypass valve motor (1530). The programmable electronic controller (2000) receives the supply valve signal (442), the backwash valve signal (742), the outlet valve signal (1242), the fast rinse valve signal (1442), the bypass valve signal (1542), and optionally, the regeneration valve signal (1728). After receiving one or more of the signals (442, 742, 1242, 1442, 1542, 1728), the programmable electronic controller (2000) operates the supply valve motor (430), the backwash valve (730), the outlet valve motor (1230), the fast rinse valve motor (1430), and the bypass valve motor (1530) in a preprogrammed fashion. The programmable electronic controller (2000) may be a PLC (programmable logic controller) or other simple processor. The operation of the valves may occur individually, as part of a sequencing scheme, or may be in response to internal or external events affecting the water softening system.

In another embodiment of the instant invention, seen in FIG. 17, the water control valve (100) includes a supply chamber (500) that is in fluid communication with the backwash chamber (600) and the supply valve (400) and an outlet chamber (1100) that is in fluid communication with the fast rinse chamber (1000) and the outlet valve (1200).

In another embodiment of the instant invention, the perimeter port (820) and the central port (920) may be disparate ports, connecting to separate ports on the water treatment tank (35).

As those skilled in the art will appreciate, the housing (200) may have two or more component parts that can be assembled efficiently with the valves enclosed within. The component parts may be snap type construction permitting the components to be forced together, requiring little or no adhesive, or may be sealed with an o-ring type seal, to create a water tight seal.

As those skilled in the art will appreciate, the term "water" herein means any fluid or mixture thereof.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A water control valve (100) for controlling the flow of water through a treatment tank (30) containing a plurality of media (35) for the purpose of (A) directing untreated water (10) through the media (35) to make treated water (20), (B) backwashing the media (35) with the untreated water (10) to dislodge any sediment to a drain (40) as waste water (70), (C) injecting a regenerating agent (50) supplied by a regeneration agent reservoir (60) into the untreated water (10) to regenerate the media (35), (D) rinsing the media (35) while providing treated water (20) for distribution, and (E) refilling the regeneration agent reservoir (60) with the untreated water (10), comprising:

a housing (200) having an influent chamber (300), a backwash chamber (600), a fast rinse chamber (1000), an effluent chamber (1300), and a discharge chamber (1600), the housing (200) enclosing a supply valve (400), a backwash valve (700), an outlet valve (1200), a fast rinse valve (1400), and a bypass valve (1500), and the housing (200) having a perimeter passageway (800) and a central passageway (900), wherein:
(i) the influent chamber (300) has an influent source port (320) for receiving the untreated water (10), wherein the influent chamber (300) is in fluid communication with the supply valve (400) and the bypass valve (1500);
(ii) the backwash chamber (600) is in fluid communication with the supply valve (400) and the backwash valve (700);
(iii) the discharge chamber (1600) has a discharge port (1610), and the discharge chamber (1600) is in fluid communication with the backwash valve (700) and the fast rinse valve (1400);
(iv) the fast rinse chamber (1000) is in fluid communication with the outlet valve (1200) and the fast rinse valve (1400);
(v) the effluent chamber (1300) has and an effluent port (1320), and the effluent chamber (1300) is in fluid communication with the outlet valve (1200) and the bypass valve (1500);
(vi) the perimeter passageway (800) has a backwash port (810) and a perimeter port (820), wherein the backwash port (810) is in fluid communication with the backwash chamber (600) and the perimeter port (820) is in fluid communication with the treatment tank (30); and
(vii) the central passageway (900) has a fast rinse port (910) and a central port (920), wherein the fast rinse port (910) is in fluid communication with the fast rinse chamber (1000) and the central port (920) is in fluid communication with the treatment tank (30).

2. The water control valve (100) of claim 1, wherein
(A) the supply valve (400) has an open position and a closed position, wherein when the supply valve (400) is open, the influent chamber (300) is in fluid communication with the backwash chamber (600), and when the supply valve (400) is closed, water is substantially prevented from flowing from the influent chamber (300) to the backwash chamber (600);
(B) the backwash valve (700) has an open position and a closed position, wherein when the backwash valve (700) is open, the backwash chamber (600) is in fluid communication with the discharge chamber (1600), and when the backwash valve (700) is closed, water is substantially prevented from flowing from the backwash chamber (600) to the discharge chamber (1600);

(C) the outlet valve (1200) has an open position and a closed position, wherein when the outlet valve (1200) is open, the fast rinse chamber (1000) is in fluid communication with the effluent chamber (1300), and when the outlet valve (1200) is closed, water is substantially prevented from flowing from the fast rinse chamber (1000) to the effluent chamber (1300);

(D) the fast rinse valve (1400) has an open position and a closed position, wherein when the fast rinse valve (1400) is open, the discharge chamber (1600) is in fluid communication with the fast rinse chamber (1000), and when the fast rinse valve (1400) is closed, water is substantially prevented from flowing from the discharge chamber (1600) to the fast rinse chamber (1000); and (E) the bypass valve (1500) has an open position and a closed position, wherein when the bypass valve (1500) is open, the influent chamber (300) is in fluid communication with the effluent chamber (1300), and when the bypass valve (1500) is closed, water is substantially prevented from flowing from the influent chamber (300) to the bypass chamber (1500).

3. The water control valve (100) of claim 2, further including an injection assembly (1700) having a regeneration connection port (1710), a regeneration valve (1720), a regeneration connector (1730), and a regeneration passageway (1740), and wherein the influent chamber (300) has an influent routing port (310) and the backwash chamber (600) has a backwash injection port (610), wherein, (A) the regeneration connection port (1710) is in fluid communication with the regeneration agent reservoir (60), the regeneration valve (1720) is in fluid communication with the regeneration connection port (1710) and the regeneration passageway (1740), and the regeneration passageway (1740) is in fluid communication with the regeneration connector (1730);

(B) the regeneration valve (1720) has an open position and a closed position, and when the regeneration valve (1720) is open, the regenerating agent (50) flows from the regeneration agent reservoir (60) through the regeneration passageway (1740) to the regeneration connector (1730), and when the regeneration valve (1720) is in closed, the regenerating agent (50) is substantially prevented from flowing from the regeneration agent reservoir (60) through the regeneration passageway (1740) to the regeneration connector (1730);

(C) the regeneration connector (1730) contains a regeneration agent injector (1732) that introduces the regenerating agent (50) into the untreated water (10); and (D) the regeneration connector (1730) is in fluid communication with the influent routing port (310) and the backwash injection port (610), such that when the untreated water (10) flows from the influent chamber (300) through the regeneration connector (1730) into the backwash chamber (600), the untreated water (10) flows through the regeneration agent injector (1732).

4. The water control valve (100) of claim 2, further including an injection assembly (1700) having a regeneration connection port (1710), a regeneration valve (1720), a regeneration connector (1730), and a regeneration passageway (1740), and wherein the effluent chamber (1300) has an effluent routing port (1310) and the fast rinse chamber (1000) has a fast rinse injection port (1010), wherein, (A) the regeneration connection port (1710) is in fluid communication with the regeneration agent reservoir (60), the regeneration valve (1720) is in fluid communication with the regeneration connection port (1710) and the regeneration passageway (1740), and the regeneration passageway (1740) is in fluid communication with the regeneration connector (1730);

(B) the regeneration valve (1720) has an open position and a closed position, and when the regeneration valve (1720) is open, the regenerating agent (50) flows from the regeneration agent reservoir (60) through the regeneration passageway (1740) to the regeneration connector (1730), and when the regeneration valve (1720) is in closed, the regenerating agent (50) is substantially prevented from flowing from the regeneration agent reservoir (60) through the regeneration passageway (1740) to the regeneration connector (1730);

(C) the regeneration connector (1730) contains a regeneration agent injector (1732) that introduces the regenerating agent (50) to the untreated water (10); and (D) the regeneration connector (1730) is in fluid communication with the effluent routing port (1310) and the fast rinse injection port (1010), such that when the untreated water (10) flows from the effluent chamber (1300) through the regeneration connector (1730) to the fast rinse chamber (1000), the untreated water (10) flows through the regeneration agent injector (1732).

5. The water control valve (100) of claim 2, wherein the supply valve (400), the backwash valve (700), the fast rinse valve (1400), the outlet valve (1200), and the bypass valve (1500) define a service cycle, a backwash cycle, and a fast rinse cycle, wherein (A) in the service cycle,
(i) the supply valve (400) is open,
(ii) the backwash valve (700) is closed,
(iii) the fast rinse valve (1400) is closed,
(iv) the outlet valve (1200) is open, and
(v) the bypass valve (1500) is closed, the untreated water (10) is directed from the influent source port (320) into the influent chamber (300), through the supply valve (400), into the backwash chamber (600), through the backwash port (810), and through the perimeter passageway (800), through the perimeter port (820), and into the treatment tank (30), is treated by the media (35) and then flows through the central port (920), through the central passageway (900), through the fast rinse port (910), into the fast rinse chamber (1000), through the outlet valve (1200), into the effluent chamber (1300), and out of the effluent port (1320) as treated water (20);

(B) in the backwash cycle,
(i) the supply valve (400) is closed,
(ii) the backwash valve (700) is open,
(iii) the fast rinse valve (1400) is closed,
(iv) the outlet valve (1200) is open, and
(v) the bypass valve (1500) is open, the untreated water (10) enters through the influent source port (320) into the influent chamber (300), flows through the bypass valve (1500) and into the effluent chamber (1300), and is then simultaneously directed through
(a) the effluent port (1320), and
(b) the outlet valve (1200), into the fast rinse chamber (1000), through the fast rinse port (910), through the central passageway (900), through the central port (920), and into the treatment tank (30) for washing the media (35) of any sediment, and then flows through the perimeter port (820), through the perimeter passageway (800), through the backwash port (810), into the backwash chamber (600), through the backwash valve (700), into the discharge chamber (1600), and through the discharge port (1610) as waste water (70); and (C) in the fast rinse cycle,
  (i) the supply valve (400) is open,
  (ii) the backwash valve (700) is closed,
  (iii) the fast rinse valve (1400) is open,
  (iv) the outlet valve (1200) is open, and
  (v) the bypass valve (1500) is closed, and the untreated water (10) enters into the influent chamber (300) through the influent source port (320), and is then directed through the supply valve (400), into the backwash chamber (600), through the backwash port (810), through the perimeter passageway (800), through the perimeter port (820), and into the treatment tank (30) to rinse the media (35), then flows out of the treatment tank (30), through the central port (920), through the central passageway (900), through the fast rinse port (910), into the fast rinse chamber (1000), and then simultaneously directed through
    (a) the outlet valve (1200), into the effluent chamber (1300), and out the effluent port (1320) as treated water (20), and
    (b) the fast rinse valve (1400), into the discharge chamber (1600), and out through the discharge port (1610).

6. The water control valve (100) of claim 3, wherein the supply valve (400), the backwash valve (700), the fast rinse valve (1400), the outlet valve (1200), the bypass valve (1500), and the regeneration valve (1720) define a down regeneration cycle and a down regeneration refill cycle, wherein
  (A) in the down regeneration cycle,
    (i) the supply valve (400) is closed,
    (ii) the backwash valve (700) is closed,
    (ii) the fast rinse valve (1400) is open,
    (iii) the outlet valve (1200) is closed,
    (iv) the bypass valve (1500) is open, and
    (v) the regeneration valve (1720) is open, the untreated water (10) enters into the influent chamber (300) through the influent source port (320) and then is simultaneously directed
      (a) through the bypass valve (1500) into the effluent chamber (1300) and out through the effluent port (1320) for distribution, and
      (b) to the regeneration injection assembly (1700) through the influent routing port (310) into the regeneration connector (1730) and through the regeneration agent injector (1732), where the regeneration agent (50) is added, then through the backwash injector port (610), into the backwash chamber (600), through the backwash port (820), through the perimeter passageway (800), through the backwash port (810), and into the treatment tank (30) to treat the media (35), out of the treatment tank (30), through the central port (920), through the central passageway (900), through the fast rinse port (910), and into the fast rinse chamber (1000), through the fast rinse valve (1400), into the discharge chamber (1600), and out the discharge port (1610) as waste water (70); and
  (B) in the down regeneration refill cycle,
    (i) the supply valve (400) is open,
    (ii) the backwash valve (700) is closed,
    (iii) the fast rinse valve (1400) is closed,
    (iv) the outlet valve (1200) is closed,
    (v) the bypass valve (1500) is open, and
    (vi) the regeneration valve (1720) is open, the untreated water (10) is directed from the influent source port (320) into the influent chamber (300) and then, simultaneously,
      (a) through the supply valve (400) and into the backwash chamber (600), through the backwash injection port (610) into the regeneration connector (1730),
      (b) into the regeneration injection assembly (1700) through the influent injection port (310) into the regeneration connector (1730), then through the regeneration agent injector (1732), into the regeneration passageway (1740), through the regeneration valve (1720) and regeneration port (1710), and into the regeneration agent reservoir (60), and
      (c) through the bypass valve (1500) into the effluent chamber (1300) and out of the effluent port (1320) for distribution.

7. The water control valve (100) of claim 4, wherein the supply valve (400), the backwash valve (700), the fast rinse valve (1400), the outlet valve (1200), the bypass valve (1500), and the regeneration valve (1720) define an up regeneration cycle and an up regeneration refill cycle, wherein
  (A) in the up regeneration cycle,
    (i) the supply valve (400) is closed,
    (ii) the backwash valve (700) is open,
    (ii) the fast rinse valve (1400) is closed,
    (iii) the outlet valve (1200) is closed,
    (iv) the bypass valve (1500) is open,
    (v) the regeneration valve (1720) is open, and the untreated water (10) enters into the influent chamber (300) through the influent source port (320) through the bypass valve (1500) into the effluent chamber (1300) and is then simultaneously directed
      (a) out through the effluent port (1320) for distribution, and
      (b) to the regeneration injection assembly (1700) through the effluent routing port (1310) into the regeneration connector (1730) and through the regeneration agent injector (1732), where the regeneration agent (50) is added, then through the fast rinse injector port (1010) into the fast rinse chamber (1000), through the fast rinse port (910), through the central passageway (900), through the central port (920), into the treatment tank (30) to treat the media (35), out of the treatment tank (30), through the perimeter port (820), through the perimeter passageway (800), through the backwash port (810), into the backwash chamber (600), through the backwash valve (700), into the discharge chamber (1600), and out the discharge port (1610) as waste water (70); and
  (B) in the up regeneration refill cycle,
    (i) the supply valve (400) is open,
    (ii) the backwash valve (700) is closed,
    (iii) the fast rinse valve (1400) is closed,
    (iv) the outlet valve (1200) is closed,
    (v) the bypass valve (1500) is open, and
    (vi) the regeneration valve (1720) is open, and the untreated water (10) is directed from the influent source port (320) and into the influent chamber (300) and simultaneously
      (a) through the supply valve (400) and into the backwash chamber (600), through the backwash injection port (810), into the perimeter passageway (800), through the perimeter port (820), and into the treatment tank (30) for treatment, then out of the treatment tank (30), through the central port (920), through the central passageway (900), through the fast rinse port (910), into the fast rinse chamber (1000), through the fast rinse injection port (1010), into the regeneration connector (1730), and through the regeneration agent injector (1732) and then is simultaneously directed into the regeneration passageway (1740), through the regeneration valve (1720) and regeneration port (1710), and into the regeneration agent reservoir (60), and into the effluent chamber (1300), (b) through the bypass valve (1500) into the effluent chamber (1300) where untreated water (10) mixes with treated water (20) which are distributed through the effluent port (1320).

8. The water control valve (100) of claim 3, wherein the outlet valve (1200) and the regeneration valve (1720) are operatively connected such that when the outlet valve (1200) is open, the regeneration valve (1720) is closed, and when then outlet valve (1200) is closed, the regeneration valve (1720) is open.

9. The water control valve (100) of claim 4, wherein the outlet valve (1200) and the regeneration valve (1720) are operatively connected such that when the outlet valve (1200) is open, the regeneration valve (1720) is closed, and when then outlet valve (1200) is closed, the regeneration valve (1720) is open.

10. The water control valve (100) of claim 3, wherein the supply valve (400) is rotatably joined to a supply motor (430), the backwash valve (700) is rotatably joined to a backwash valve motor (730), the fast rinse valve (1400) is rotatably joined to a fast rinse valve motor (1430), the bypass valve (1500) is rotatably joined a bypass valve motor (1530), and the outlet valve (1200) and the regeneration valve (1720) are rotatably joined to an outlet valve motor (1230).

11. The water control valve (100) of claim 4, wherein the supply valve (400) is rotatably joined to a supply motor (430), the backwash valve (700) is rotatably joined to a backwash valve motor (730), the fast rinse valve (1400) is rotatably joined to a fast rinse motor (1430), the bypass valve (1500) is rotatably joined a bypass valve motor (1530), and the outlet valve (1200) and the regeneration valve (1720) are rotatably joined to an outlet valve motor (1230).

12. The water control valve (100) of claim 1, wherein the supply valve (400) has a supply valve sensor (440) which generates a supply valve signal (442), the backwash valve (700) has a backwash valve sensor (740) which generates a backwash valve signal (742), the outlet valve (1200) has an outlet valve sensor (1240) which generates an outlet valve signal (1242), the fast rinse valve (1400) has a fast rinse valve sensor (1440) which generates a fast rinse valve signal (1442), and the bypass valve (1500) has a bypass valve sensor (1540) which generates a bypass signal (1542).

13. The water control valve (100) of claim 12, wherein the supply valve (400) is rotatably joined to a supply motor (430), the backwash valve (700) is rotatably joined to a backwash valve motor (730), the fast rinse valve (1400) is rotatably joined to a fast rinse motor (1430), the bypass valve (1500) is rotatably joined a bypass valve motor (1530), and the outlet valve (1200) is rotatably joined to an outlet valve motor (1230).

14. The water control valve (100) of claim 13, further including a programmable electronic controller (2000) having a supply valve motor output (2100) for controlling the supply valve motor (430), a backwash valve motor output (2200) for controlling the backwash valve motor (730), an outlet valve motor output (2300) for controlling the outlet valve motor (1230), a fast rinse valve motor output (2400) for controlling the outlet valve motor (1230), and a bypass valve motor output (2500) for controlling the bypass valve motor (1530), wherein the electronic controller receives the supply valve signal (442), the backwash valve signal (742), the outlet valve signal (1242), the fast rinse valve signal (1442), and the bypass valve signal (1542), and wherein the programmable electronic controller (2000) operates the supply valve motor (430), the backwash valve (730), the outlet valve motor (1230), the fast rinse valve motor (1430), and the bypass valve motor (1530) in a preprogrammed fashion.

15. The water control valve (100) of claim 3, wherein the regeneration agent injector (1732) is a venturi device such that, while the regeneration valve (1720) is open, and as the untreated water (10) flows from the influent chamber (300) through the influent routing port (310) into the regeneration connector (1730) and through the regeneration agent injector (1732) and into the backwash chamber (600) through the backwash injection port (610), a vacuum is induced in the regeneration passageway (1740) which injects the regeneration agent (50) into the untreated water (10).

16. The water control valve (100) of claim 4, wherein the regeneration agent injector (1732) is a venturi device such that, while the regeneration valve (1720) is open, and as the untreated water (10) flows from the effluent chamber (1300) through the effluent routing port (1310) into the regeneration connector (1730) and through the regeneration agent injector (1732) and through the fast rinse injection port (1010) into the fast rinse chamber (1000), a vacuum is induced in the regeneration passageway (1740) which injects the regeneration agent (50) into the untreated water (10).

17. A water control valve (100) for controlling the flow of water through a treatment tank (30) containing a plurality of media (35) for the purpose of (A) directing untreated water (10) through the media (35) to make treated water (20), (B) backwashing the media (35) with the untreated water (10) to dislodge any sediment to a drain (40) as waste water (70), (C) injecting a regenerating agent (50) supplied by a regeneration agent reservoir (60) into the untreated water (10) to regenerate the media (35), (D) rinsing the media (35) while providing treated water (20) for distribution, and (E) refilling the regeneration agent reservoir (60) with the untreated water (10), comprising:

a housing (200) having an influent chamber (300), a backwash chamber (600), a fast rinse chamber (1000), an effluent chamber (1300), and a discharge chamber (1600), the housing (200) enclosing a supply valve (400), a backwash valve (700), an outlet valve (1200), a fast rinse valve (1400), and a bypass valve (1500), and the housing (200) having a perimeter passageway (800) and a central passageway (900), wherein:

(i) the influent chamber (300) has an influent source port (320) for receiving the untreated water (10), wherein the influent chamber (300) is in fluid communication with the supply valve (400) and the bypass valve (1S500);

(ii) the backwash chamber (600) is in fluid communication with the supply valve (400) and the backwash valve (700);

(iii) the discharge chamber (1600) has a discharge port (1610), and the discharge chamber (1600) is in fluid communication with the backwash valve (700) and the fast rinse valve (1400);

(iv) the fast rinse chamber (1000) is in fluid communication with the outlet valve (1200) and the fast rinse valve (1400);

(v) the effluent chamber (1300) has and an effluent port (1320), and the effluent chamber (1300) is in fluid communication with the outlet valve (1200) and the bypass valve (1500);

(vi) the perimeter passageway (800) has a backwash port (810) and a perimeter port (820), wherein the backwash port (810) is in fluid communication with the backwash chamber (600) and the perimeter port (820) is in fluid communication with the treatment tank (30); and (vii) the central passageway (900) has a fast rinse port (910) and a central port (920), wherein the fast rinse port (910) is in fluid communication with the fast rinse chamber (1000) and the central port (920) is in fluid communication with the treatment tank (30);

an injection assembly (1700) having a regeneration connection port (1710), a regeneration valve (1720), a regeneration connector (1730), and a regeneration passageway (1740), and wherein the influent chamber (300) has an influent routing port (310) and the backwash chamber (600) has a backwash injection port (610), wherein, (i) the regeneration connection port (1710) is in fluid communication with the regeneration agent reservoir (60), the regeneration valve (1720) is in fluid communication with the regeneration connection port (1710) and the regeneration passageway (1740), and the regeneration passageway (1740) is in fluid communication with the regeneration connector (1730);

(ii) the regeneration valve (1720) has an open position and a closed position, and when the regeneration valve (1720) is open, the regenerating agent (50) flows from the regeneration agent reservoir (60) through the regeneration passageway (1740) to the regeneration connector (1730), and when the regeneration valve (1720) is closed, the regenerating agent (50) is substantially prevented from flowing from the regeneration agent reservoir (60) through the regeneration passageway (1740) to the regeneration connector (1730);

(iii) the regeneration connector (1730) contains a regeneration agent injector (1732) that introduces the regenerating agent (50) into the untreated water (10); and (iv) the regeneration connector (1730) is in fluid communication with the influent routing port (310) and the backwash injection port (610), such that when the untreated water (10) flows from the influent chamber (300) through the regeneration connector (1730) into the backwash chamber (600), the untreated water (10) flows through the regeneration agent injector (1732); and wherein (A) the supply valve (400) has an open position and a closed position, wherein when the supply valve (400) is open, water flows from the influent chamber (300) to the backwash chamber (600), and when the supply valve (400) is closed, water is substantially prevented from flowing from the influent chamber (300) to the backwash chamber (600);

(B) the backwash valve (700) has an open position and a closed position, wherein when the backwash valve (700) is open, water flows from the backwash chamber (600) to the discharge chamber (1600), and when the backwash valve (700) is closed, water is substantially prevented from flowing from the backwash chamber (600) to the discharge chamber (1600);

(C) the outlet valve (1200) has an open position and a closed position, wherein when the outlet valve (1200) is open, water flows from the fast rinse chamber (1000) to the effluent chamber (1300), and when the outlet valve (1200) is closed, water is substantially prevented from flowing from the fast rinse chamber (1000) to the effluent chamber (1300);

(D) the fast rinse valve (1400) has an open position and a closed position, wherein when the fast rinse valve (1400) is open, water flows from the discharge chamber (1600) to the fast rinse chamber (1000), and when the fast rinse valve (1400) is closed, water is substantially prevented from flowing from the discharge chamber (1600) to the fast rinse chamber (1000); and (E) the bypass valve (1500) has an open position and a closed position, wherein when the bypass valve (1500) is open, water flows from the influent chamber (300) to the effluent chamber (1300), and when the bypass valve (1500) is closed, water is substantially prevented from flowing from the influent chamber (300) to the bypass chamber (1500).

18. The water control valve (100) of claim 17, wherein the supply valve (400), the backwash valve (700), the fast rinse valve (1400), the outlet valve (1200), the bypass valve (1500), and the regeneration valve (1720) define a service cycle, a backwash cycle, a fast rinse cycle, a down regeneration cycle and a down regeneration refill cycle, wherein (A) in the service cycle,
(i) the supply valve (400) is open,
(ii) the backwash valve (700) is closed,
(iii) the fast rinse valve (1400) is closed,
(iv) the outlet valve (1200) is open, and
(v) the bypass valve (1500) is closed, the untreated water (10) is directed from the influent source port (320) into the influent chamber (300), through the supply valve (400), into the backwash chamber (600), through the backwash port (810), and through the perimeter passageway (800), through the perimeter port (820), and into the treatment tank (30), is treated by the media (35) and then flows through the central port (920), through the central passageway (900), through the fast rinse port (910), into the fast rinse chamber (1000), through the outlet valve (1200), into the effluent chamber (1300), and out of the effluent port (1320) as treated water (20);

(B) in the backwash cycle,
(i) the supply valve (400) is closed,
(ii) the backwash valve (700) is open,
(iii) the fast rinse valve (1400) is closed,
(iv) the outlet valve (1200) is open, and
(v) the bypass valve (1500) is open, the untreated water (10) enters through the influent source port (320) into the influent chamber (300), flows through the bypass valve (1500) and into the effluent chamber (1300), and is then simultaneously directed through
  (a) the effluent port (1320), and
  (b) the outlet valve (1200), into the fast rinse chamber (1000), through the fast rinse port (910), through the central passageway (900), through the central port (920), and into the treatment tank (30) for washing the media (35) of any sediment, and then flows through the perimeter port (820), through the perimeter passageway (800), through the backwash port (810), into the backwash chamber (600), through the backwash valve (700), into the discharge chamber (1600), and through the discharge port (1610) as waste water (70); and (C) in the fast rinse cycle,
(i) the supply valve (400) is open,
(ii) the backwash valve (700) is closed,
(iii) the fast rinse valve (1400) is open, (iv) the outlet valve (1200) is open, and
(v) the bypass valve (1500) is closed, and the untreated water (10) enters into the influent chamber (300) through the influent source port (320), and is then directed through the supply valve (400), into the backwash chamber (600), through the backwash port (810), through the perimeter passageway (800), through the perimeter port (820), and into the treatment tank (30) to rinse the media (35), then flows out of the treatment tank (30), through the central port (920), through the central passageway (900), through the fast rinse port (910), into the fast rinse chamber (1000), and then simultaneously directed through
(a) the outlet valve (1200), into the effluent chamber (1300), and out the effluent port (1320) as treated water (20), and
(b) the fast rinse valve (1400), into the discharge chamber (1600), and out through the discharge port (1610);
(D) in the down regeneration cycle,
(i) the supply valve (400) is closed,
(ii) the backwash valve (700) is closed,
(ii) the fast rinse valve (1400) is open,
(iii) the outlet valve (1200) is closed,
(iv) the bypass valve (1500) is open, and
(v) the regeneration valve (1720) is open, the untreated water (10) enters into the influent chamber (300) through the influent source port (320) and then is simultaneously directed
(a) through the bypass valve (1500) into the effluent chamber (1300) and out through the effluent port (1320) for distribution, and
(b) to the regeneration injection assembly (1700) through the influent routing port (310) into the regeneration connector (1730) and through the regeneration agent injector (1732), where the regeneration agent (50) is added, then through the backwash injector port (610), into the backwash chamber (600), through the backwash port (820), through the perimeter passageway (800), through the backwash port (810), and into the treatment tank (30) to treat the media (35), out of the treatment tank (30), through the central port (920), through the central passageway (900), through the fast rinse port (910), and into the fast rinse chamber (1000), through the fast rinse valve (1400), into the discharge chamber (1600), and out the discharge port (1610) as waste water (70); and
(E) in the down regeneration refill cycle,
(i) the supply valve (400) is open,
(ii) the backwash valve (700) is closed,
(iii) the fast rinse valve (1400) is closed,
(iv) the outlet valve (1200) is closed,
(v) the bypass valve (1500) is open, and
(vi) the regeneration valve (1720) is open, the untreated water (10) is directed from the influent source port (320) into the influent chamber (300) and then, simultaneously,
(a) through the supply valve (400) and into the backwash chamber (600), through the backwash injection port (610) into the regeneration connector (1730),
(b) into the regeneration injection assembly (1700) through the influent injection port (310) into the regeneration connector (1730), then through the regeneration agent injector (1732), into the regeneration passageway (1740), through the regeneration valve (1720) and regeneration port (1710), and into the regeneration agent reservoir (60), and
(c) through the bypass valve (1500) into the effluent chamber (1300) and out of the effluent port (1320) for distribution.

19. The water control valve (100) of claim 17, wherein the outlet valve (1200) and the regeneration valve (1720) are operatively connected such that when the outlet valve (1200) is open, the regeneration valve (1720) is closed, and when then outlet valve (1200) is closed, the regeneration valve (1720) is open.

20. The water control valve (100) of claim 17, wherein the regeneration agent injector (1732) is a venturi device such that, while the regeneration valve (1720) is open, and as the untreated water (10) flows from the influent chamber (300) through the influent routing port (310) into the regeneration connector (1730) and through the regeneration agent injector (1732) and into the backwash chamber (600) through the backwash injection port (610), a vacuum is induced in the regeneration passageway (1740) which injects the regeneration agent (50) into the untreated water (10).

21. A water control valve (100) for controlling the flow of water through a treatment tank (30) containing a plurality of media (35) for the purpose of (A) directing untreated water (10) through the media (35) to make treated water (20), (B) backwashing the media (35) with the untreated water (10) to dislodge any sediment to a drain (40) as waste water (70), (C) injecting a regenerating agent (50) supplied by a regeneration agent reservoir (60) into the untreated water (10) to regenerate the media (35), (D) rinsing the media (35) while providing treated water (20) for distribution, and (E) refilling the regeneration agent reservoir (60) with the untreated water (10), comprising:
a housing (200) having an influent chamber (300), a backwash chamber (600), a fast rinse chamber (1000), an effluent chamber (1300), and a discharge chamber (1600), the housing (200) enclosing a supply valve (400), a backwash valve (700), an outlet valve (1200), a fast rinse valve (1400), and a bypass valve (1500), and the housing (200) having a perimeter passageway (800) and a central passageway (900), wherein:
(i) the influent chamber (300) has an influent source port (320) for receiving the untreated water (10), wherein the influent chamber (300) is in fluid communication with the supply valve (400) and the bypass valve (1500);
(ii) the backwash chamber (600) is in fluid communication with the supply valve (400) and the backwash valve (700);
(iii) the discharge chamber (1600) has a discharge port (1610), and the discharge chamber (1600) is in fluid communication with the backwash valve (700) and the fast rinse valve (1400);
(iv) the fast rinse chamber (1000) is in fluid communication with the outlet valve (1200) and the fast rinse valve (1400);
(v) the effluent chamber (1300) has and an effluent port (1320), and the effluent chamber (1300) is in fluid communication with the outlet valve (1200) and the bypass valve (1500);
(vi) the perimeter passageway (800) has a backwash port (810) and a perimeter port (820), wherein the backwash port (810) is in fluid communication with the backwash chamber (600) and the perimeter port (820) is in fluid communication with the treatment tank (30); and (vii) the central passageway (900) has a fast rinse port (910) and a central port (920), wherein the fast rinse port (910) is in fluid communication with the fast rinse chamber (1000) and the central port (920) is in fluid communication with the treatment tank (30);

an injection assembly (1700) having a regeneration connection port (1710), a regeneration valve (1720), a regeneration connector (1730), and a regeneration passageway (1740), and wherein the effluent chamber (1300) has an effluent routing port (1310) and the fast rinse chamber (1000) has a fast rinse injection port (1010), wherein:

(i) the regeneration connection port (1710) is in fluid communication with the regeneration agent reservoir (60), the regeneration valve (1720) is in fluid communication with the regeneration connection port (1710) and the regeneration passageway (1740), and the regeneration passageway (1740) is in fluid communication with the regeneration connector (1730);

(ii) the regeneration valve (1720) has an open position and a closed position, and when the regeneration valve (1720) is open, the regenerating agent (50) flows from the regeneration agent reservoir (60) through the regeneration passageway (1740) to the regeneration connector (1730), and when the regeneration valve (1720) is in closed, the regenerating agent (50) is substantially prevented from flowing from the regeneration agent reservoir (60) through the regeneration passageway (1740) to the regeneration connector (1730);

(iii) the regeneration connector (1730) contains a regeneration agent injector (1732) that introduces the regenerating agent (50) to the untreated water (10); and (iv) the regeneration connector (1730) is in fluid communication with the effluent routing port (1310) and the fast rinse injection port (1010), such that when the untreated water (10) flows from the effluent chamber (1300) through the regeneration connector (1730) to the fast rinse chamber (1000), the untreated water (10) flows through the regeneration agent injector (1732); and wherein (A) the supply valve (400) has an open position and a closed position, wherein when the supply valve (400) is open, water flows from the influent chamber (300) to the backwash chamber (600), and when the supply valve (400) is closed, water is substantially prevented from flowing from the influent chamber (300) to the backwash chamber (600);

(B) the backwash valve (700) has an open position and a closed position, wherein when the backwash valve (700) is open, water flows from the backwash chamber (600) to the discharge chamber (1600), and when the backwash valve (700) is closed, water is substantially prevented from flowing from the backwash chamber (600) to the discharge chamber (1600);

(C) the outlet valve (1200) has an open position and a closed position, wherein when the outlet valve (1200) is open, water flows from the fast rinse chamber (1000) to the effluent chamber (1300), and when the outlet valve (1200) is closed, water is substantially prevented from flowing from the fast rinse chamber (1000) to the effluent chamber (1300);

(D) the fast rinse valve (1400) has an open position and a closed position, wherein when the fast rinse valve (1400) is open, water flows from the discharge chamber (1600) to the fast rinse chamber (1000), and when the fast rinse valve (1400) is closed, water is substantially prevented from flowing from the discharge chamber (1600) to the fast rinse chamber (1000); and (E) the bypass valve (1500) has an open position and a closed position, wherein when the bypass valve (1500) is open water flows from the influent chamber (300) to the effluent chamber (1300), and when the bypass valve (1500) is closed, water is substantially prevented from flowing from the influent chamber (300) to the bypass chamber (1500).

22. The water control valve (100) of claim 21, wherein the supply valve (400), the backwash valve (700), the fast rinse valve (1400), the outlet valve (1200), the bypass valve (1500), and the regeneration valve (1720) define an up regeneration cycle and an up regeneration refill cycle, wherein (A) in the service cycle,
(i) the supply valve (400) is open,
(ii) the backwash valve (700) is closed,
(iii) the fast rinse valve (1400) is closed,
(iv) the outlet valve (1200) is open, and
(v) the bypass valve (1500) is closed, the untreated water (10) is directed from the influent source port (320) into the influent chamber (300), through the supply valve (400), into the backwash chamber (600), through the backwash port (810), and through the perimeter passageway (800), through the perimeter port (820), and into the treatment tank (30), is treated by the media (35) and then flows through the central port (920), through the central passageway (900), through the fast rinse port (910), into the fast rinse chamber (1000), through the outlet valve (1200), into the effluent chamber (1300), and out of the effluent port (1320) as treated water (20);

(B) in the backwash cycle,
(i) the supply valve (400) is closed,
(ii) the backwash valve (700) is open,
(iii) the fast rinse valve (1400) is closed,
(iv) the outlet valve (1200) is open, and
(v) the bypass valve (1500) is open, the untreated water (10) enters through the influent source port (320) into the influent chamber (300), flows through the bypass valve (1500) and into the effluent chamber (1300), and is then simultaneously directed through
(a) the effluent port (1320), and
(b) the outlet valve (1200), into the fast rinse chamber (1000), through the fast rinse port (910), through the central passageway (900), through the central port (920), and into the treatment tank (30) for washing the media (35) of any sediment, and then flows through the perimeter port (820), through the perimeter passageway (800), through the backwash port (810), into the backwash chamber (600), through the backwash valve (700), into the discharge chamber (1600), and through the discharge port (1610) as waste water (70); and (C) in the fast rinse cycle,
(i) the supply valve (400) is open,
(ii) the backwash valve (700) is closed,
(iii) the fast rinse valve (1400) is open,
(iv) the outlet valve (1200) is open, and
(v) the bypass valve (1500) is closed, and the untreated water (10) enters into the influent chamber (300) through the influent source port (320), and is then directed through the supply valve (400), into the backwash chamber (600), through the backwash port (810), through the perimeter passageway (800), through the perimeter port (820), and into the treatment tank (30) to rinse the media (35), then flows out of the treatment tank (30), through the central port (920), through the central passageway (900), through the fast rinse port (910), into the fast rinse chamber (1000), and then simultaneously directed through
    (a) the outlet valve (1200), into the effluent chamber (1300), and out the effluent port (1320) as treated water (20), and
    (b) the fast rinse valve (1400), into the discharge chamber (1600), and out through the discharge port (1610);

(D) in the up regeneration cycle,
    (i) the supply valve (400) is closed,
    (ii) the backwash valve (700) is open,
    (ii) the fast rinse valve (1400) is closed,
    (iii) the outlet valve (1200) is closed,
    (iv) the bypass valve (1500) is open,
    (v) the regeneration valve (1720) is open, and the untreated water (10) enters into the influent chamber (300) through the influent source port (320) through the bypass valve (1500) into the effluent chamber (1300) and is then simultaneously directed
        (a) out through the effluent port (1320) for distribution, and
        (b) to the regeneration injection assembly (1700) through the effluent routing port (1310) into the regeneration connector (1730) and through the regeneration agent injector (1732), where the regeneration agent (50) is added, then through the fast rinse injection port (1010) into the fast rinse chamber (1000), through the fast rinse port (910), through the central passageway (900), through the central port (920), into the treatment tank (30) to treat the media (35), out of the treatment tank (30), through the perimeter port (820), through the perimeter passageway (800), through the backwash port (810), into the backwash chamber (600), through the backwash valve (700), into the discharge chamber (1600), and out the discharge port (1610) as waste water (70); and (E) in the up regeneration refill cycle,
    (i) the supply valve (400) is open,
    (ii) the backwash valve (700) is closed,
    (iii) the fast rinse valve (1400) is closed,
    (iv) the outlet valve (1200) is closed,
    (v) the bypass valve (1500) is open, and
    (vi) the regeneration valve (1720) is open, and the untreated water (10) is directed from the influent source port (320) and into the influent chamber (300) and simultaneously
        (a) through the supply valve (400) and into the backwash chamber (600), through the backwash injection port (810), into the perimeter passageway (800), through the perimeter port (820), and into the treatment tank (30) for treatment, then out of the treatment tank (30), through the central port (920), through the central passageway (900), through the fast rinse port (910), into the fast rinse chamber (1000), through the fast rinse injection port (1010), into the regeneration connector (1730), and through the regeneration agent injector (1732) and then is simultaneously directed into the regeneration passageway (1740), through the regeneration valve (1720) and regeneration port (1710), and into the regeneration agent reservoir (60), and into the effluent chamber (1300),
        (b) through the bypass valve (1500) into the effluent chamber (1300) where untreated water (10) mixes with treated water (20) which are distributed through the effluent port (1320).

23. The water control valve (100) of claim 21, wherein the outlet valve (1200) and the regeneration valve (1720) are operatively connected such that when the outlet valve (1200) is open, the regeneration valve (1720) is closed, and when then outlet valve (1200) is closed, the regeneration valve (1720) is open.

24. The water control valve (100) of claim 21, wherein the regeneration agent injector (1732) is a venturi device such that, while the regeneration valve (1720) is open, and as the untreated water (10) flows from the effluent chamber (1300) through the effluent routing port (1310) into the regeneration connector (1730) and through the regeneration agent injector (1732) and through the fast rinse injection port (1010) into the fast rinse chamber (1000), a vacuum is induced in the regeneration passageway (1740) which injects the regeneration agent (50) into the untreated water (10).

* * * * *